United States Patent
Scott-Jackson et al.

(10) Patent No.: US 6,175,358 B1
(45) Date of Patent: Jan. 16, 2001

(54) GAMEPORT COMMUNICATION APPARATUS AND METHOD

(75) Inventors: Dennis L. Scott-Jackson, Coquitlam; Harry Skibbe, Chilliwack; Peter Chi Wai Wan, Burnaby, all of (CA)

(73) Assignee: Advanced Gravis Computer Technology Ltd., Burnaby (CA)

(*) Notice: Under 35 U.S.C. 154(b), the term of this patent shall be extended for 0 days.

(21) Appl. No.: 08/984,987

(22) Filed: Dec. 4, 1997

Related U.S. Application Data

(63) Continuation of application No. 08/426,606, filed on Apr. 21, 1995, now Pat. No. 5,714,981.

(51) Int. Cl.[7] ................................................. G09G 5/08
(52) U.S. Cl. ............................................................ 345/161
(58) Field of Search .......................... 340/709; 345/161; 348/734; 395/800

(56) References Cited

U.S. PATENT DOCUMENTS

| | | | |
|---|---|---|---|
| 5,113,179 | * 5/1992 | Scott-Jackson et al. | 340/709 |
| 5,230,059 | * 7/1993 | Nielsen et al. | 395/800 |
| 5,714,981 | * 2/1998 | Scott-Jackson et al. | 345/161 |
| 5,724,106 | * 3/1998 | Autry et al. | 348/734 |
| 5,854,622 | * 5/1992 | Brannon | 345/161 |

* cited by examiner

Primary Examiner—Chanh Nguyen
Assistant Examiner—Srilakshmi K. Kumar
(74) Attorney, Agent, or Firm—McCutchen, Doyle, Brown and Enersen LLP

(57) ABSTRACT

Communication with a computer through a gameport is provided in a fashion which provides an increased information bandwidth, e.g. for coupling three or more joysticks or other peripheral devices and/or a total of five or more buttons. In one embodiment, information from joysticks or other peripheral devices is provided to the synchronous serial digitized form over the 4 button lines. X-A and Y-A lines of the gameport are used for providing, to the external devices, timing information from which load and clock signals are generated to control output of information from the peripheral devices to complete.

10 Claims, 15 Drawing Sheets

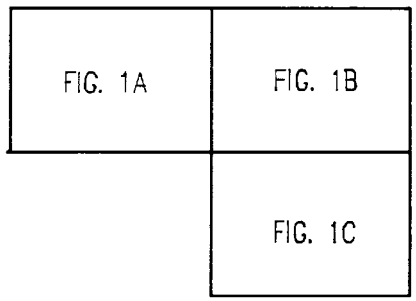
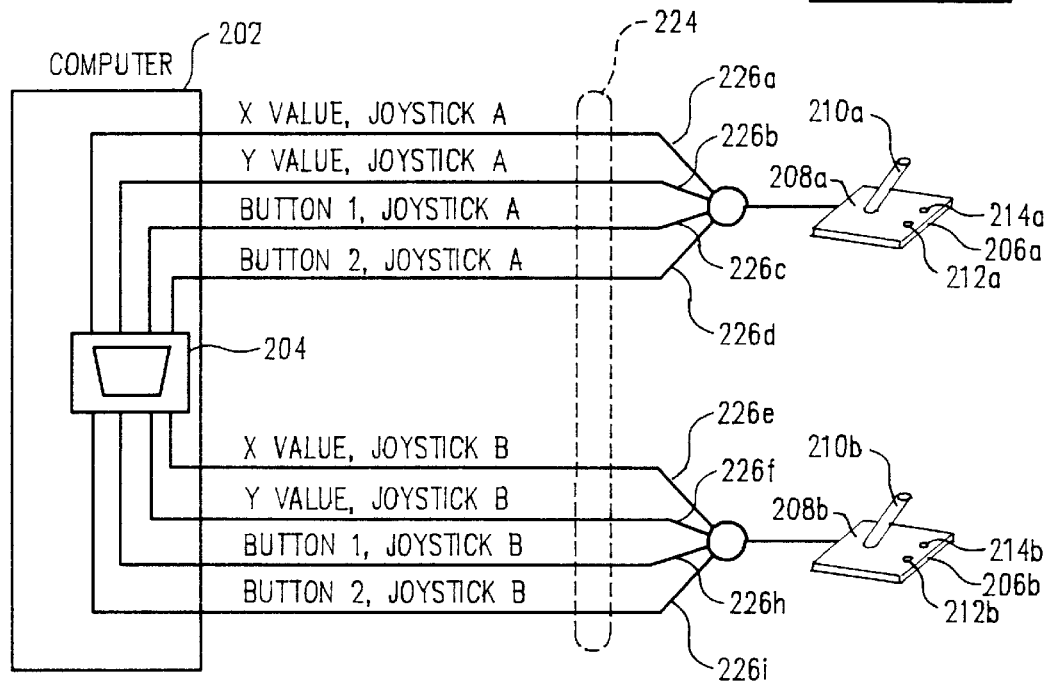
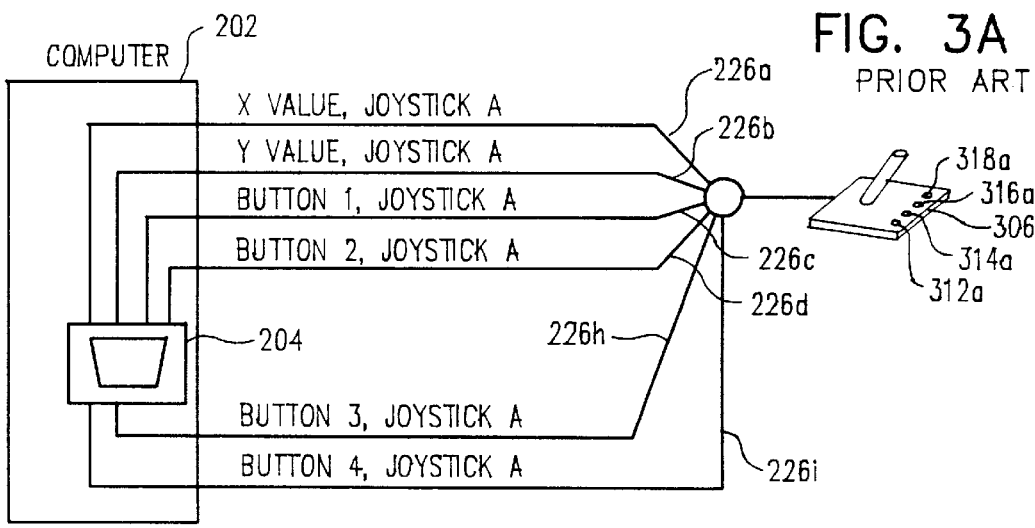

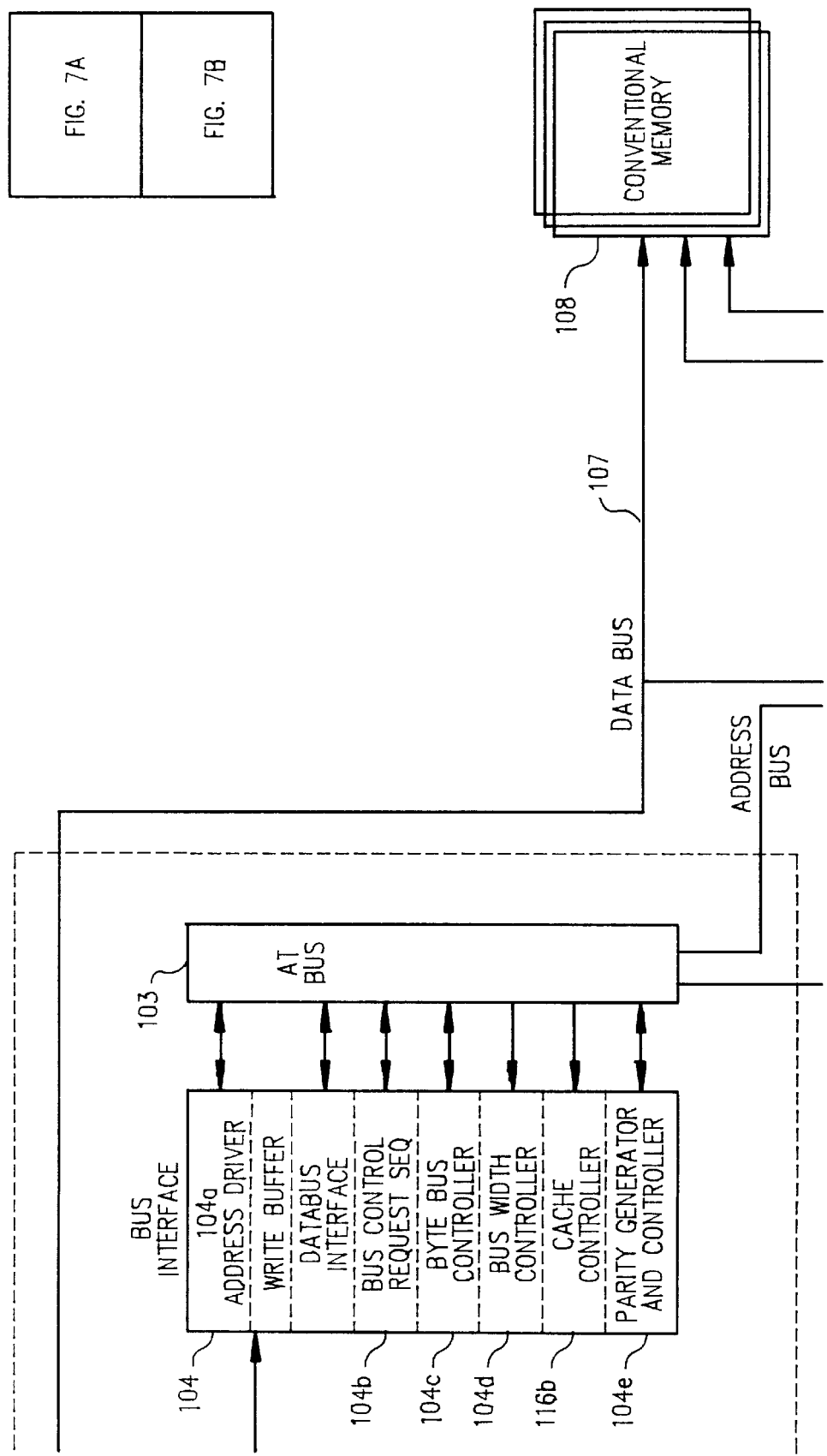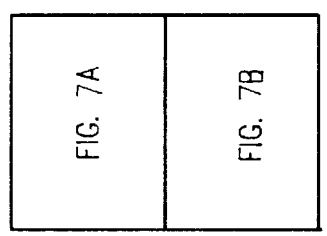

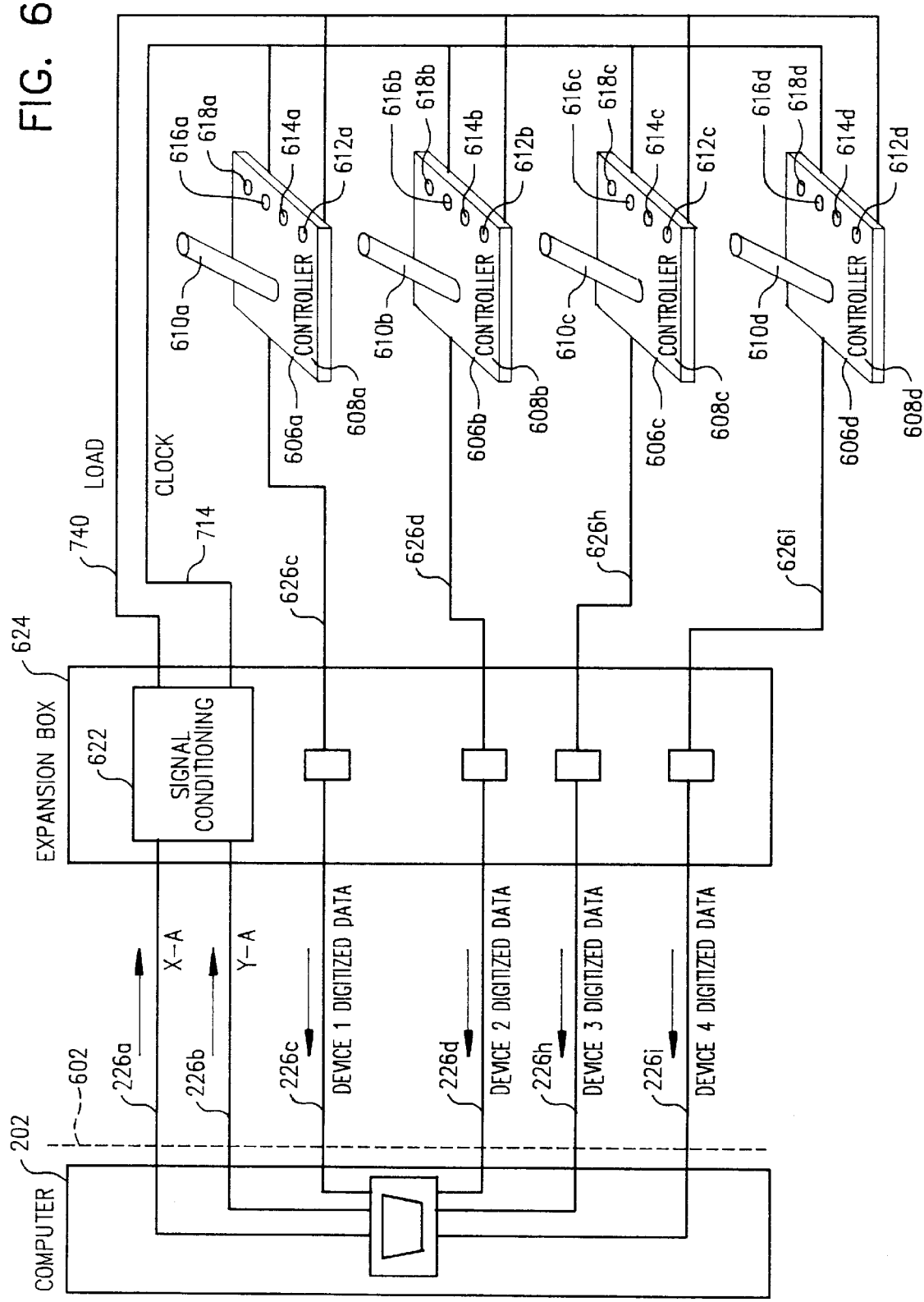

GAMEPORT COMMUNICATION APPARATUS AND METHOD

This application is a continuation of Ser. No. 08/426,606 filed Apr. 21, 1995 now Pat. No. 5,714,981.

The present invention relates to the use of a gameport in connection with a computer, and in particular to a method and apparatus for use in conjunction with gameports including those typically configured for a personal computer (PC) such as an IBM PC® or Macintosh® computer.

BACKGROUND INFORMATION

Many computers such as an IBM PC®, XT, AT, 386 and/or 486 (or compatable) computer or a Macintosh® computer are provided or retrofitted with a gameport. Various standards for gameports have been used. A common standard is that described in *IBM Technical Reference. Options and Adapters*, Vol. 2 "IBM Game Control Adapter" No. 6361493 (1986)—available as part of the IBM Personal Computer Hardware Reference Library and incorporated herein by reference. In one configuration, a gameport provides between four and eight communication lines (along with various voltage or ground lines). According to the standard, at least two, and up to four, lines are coupled to variable resistors in one or more external devices, such as the type of variable resistors found in a typical joystick input device. Typically, a joystick permits connection of two variable resistors to two of the lines, and one to four button or trigger signals over one to four of the remaining lines. A second joystick may provide for coupling of first and second variable resistors through two additional lines.

In previous devices, the use that could be made of the gameports was limited because systems were typically configured to connect a maximum of four axes and a total of four buttons. Although such systems can be used for many purposes, including playing many currently-available games on computers, because of the way the systems were configured and used in the past, the limitation on the number of joysticks that can be attached, the number of buttons that can be used, and the effective rate at which information is input from the joysticks to the computer, previous systems have restricted the use that can be made of the gameport. These restrictions are particularly apparent for more recent generations of computers which have a capability of processing information at rates which are much higher than rates at which information is provided through the gameport according to previous systems. Many previous uses of the gameport required disabling of interrupts in order to service the gameport. Additionally, previous systems typically required programmers to make frequent inquiries to determine the current condition of the joysticks attached to the gameport. This placed an undesirable programming burden on game developers. Previous uses of gameports often resulted in an undesirably high amount of overhead (i.e., the amount of CPU time which is devoted to polling or otherwise servicing the joysticks via the gameport) particularly if the programming using the gameport was not carefully written. In many cases, the difficulty and complexity of programming for previous uses of a gameport led to programming errors or software difficulties leading to calls or inquiries for technical support.

In at least some previous uses of gameports, during the periods of time the gameport was being polled or otherwise serviced it was infeasible for the computer to perform other tasks, effectively monopolizing the computer for relatively long periods; a situation which may not be tolerated by some operating systems (such as IBM® OS/2) or user interfaces (as anticipated for Microsoft® Windows 95).

It would not, in general, be desirable to completely redesign the gameport interface specifications because of the undesirability of rendering inoperative or obsolete the existing base of joysticks or other I/O devices, gameport cards or multi-I/O cards, and/or software, all of which, to a greater or lesser extent, are configured to operate in accordance with a standard gameport specification, similar to that described above.

Accordingly, it would be advantageous to provide a method and apparatus for use with a gameport which permits connection of a larger number of joysticks or other devices, provides for a higher rate of information transfer, preferably maintaining compatibility with previous gameports and/or gameport cards or multiple-I/O cards and/or, with previous joystick devices and/or previous software. It would be advantageous to provide a system which reduces programmer burden, is low cost and takes advantage of the increased speed and power of current and anticipated future computers.

SUMMARY OF THE INVENTION

The present invention includes a recognition of the problems found in previous devices. One of the difficulties of previous approaches has been the design of systems for providing information flow through the gameport in one direction only, i.e., from the joystick or other peripheral device to the computer. The present invention includes communicating information or signals from the computer to an external device through a gameport. In one embodiment, signals on one or more of the gameport lines are used by an external device to generate timing or other signals e.g., for use in controlling the flow of information to the computer.

Another difficulty with previous devices related to providing information regarding the position of a joystick in analog form. According to one embodiment of the present invention, information about the position of a joystick is transferred to the computer via a gameport in digital form. In this way, a larger amount of information can be transferred per unit time (e.g., to accommodate a larger number of joysticks, to provide more detailed or former movement discrimination, to provide additional input such as inputs from additional buttons or triggers, and the like).

According to one embodiment of the invention, information from a peripheral device such as a joystick, which may include proportional or analog information, is digitized, e.g., to indicate the position of a joystick and/or activation of one or more joystick buttons, and/or to identify the type of joystick or other device. When it is desired to obtain information about the position or status of the joystick, the computer issues a signal, causing the voltage on one of the gameport lines to change (e.g., to begin increasing). Apparatus coupled to the gameport senses this change, and generates signals. e.g., timing signals, which are used to transfer the digitized and stored data through the gameport, preferably over one of the other gameport lines. In one embodiment, the "trigger" signal is provided on the X-axis, joystick A line, and the digitized data is provided over one or more of the button lines. In one embodiment, four joysticks can be used and the digitized data from the four joysticks is provided over respective ones of the four button lines of the gameport. In one embodiment the digital data is output from the external device in synchronous serial fashion.

According to one embodiment, the external apparatus which is coupled to the gameport can be readily configured to accept data from a standard (analog) joystick, such as by providing a switch which couples a standard joystick to the gameport in the standard fashion.

BRIEF DESCRIPTION OF THE DRAWINGS

FIG. 2 is a block diagram showing communication lines coupling two joysticks to a computer via a gameport according to previous devices;

FIG. 3A is a block diagram depicting coupling of a four-button joystick to a computer via a gameport according to previous devices;

FIG. 6 is a block diagram depicting coupling of four joysticks to a computer via a gameport, using an expansion box, according to an embodiment of the present invention;

DETAILED DESCRIPTION OF THE PREFERRED EMBODIMENT

Before describing methods and apparatus according to the present invention, a short description of a computer system that can be used in connection with embodiments of the present invention will be provided.

Figure 1A:
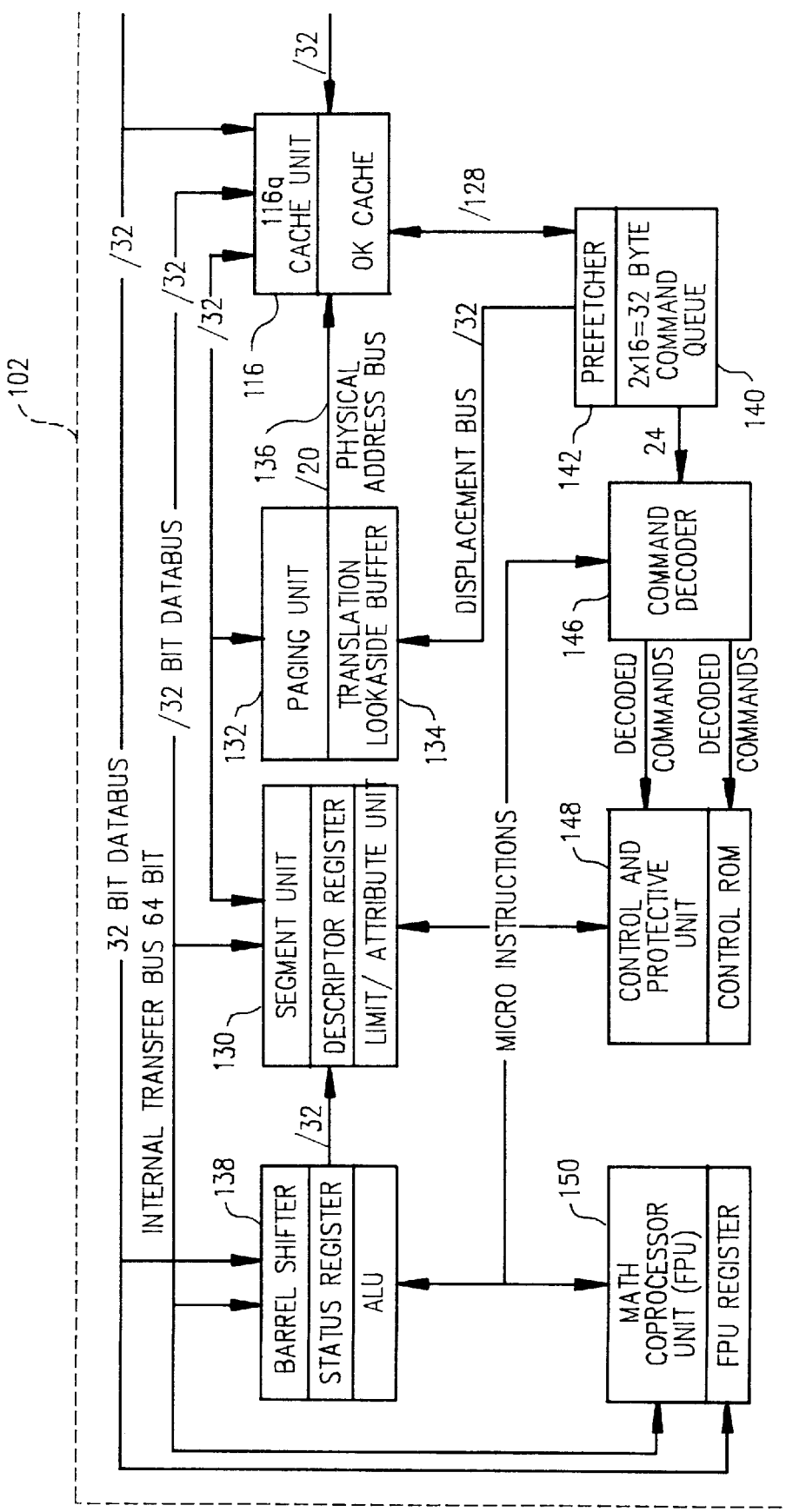
FIG. 1 is a block diagram of a typical personal computer system.
Figure 1C:
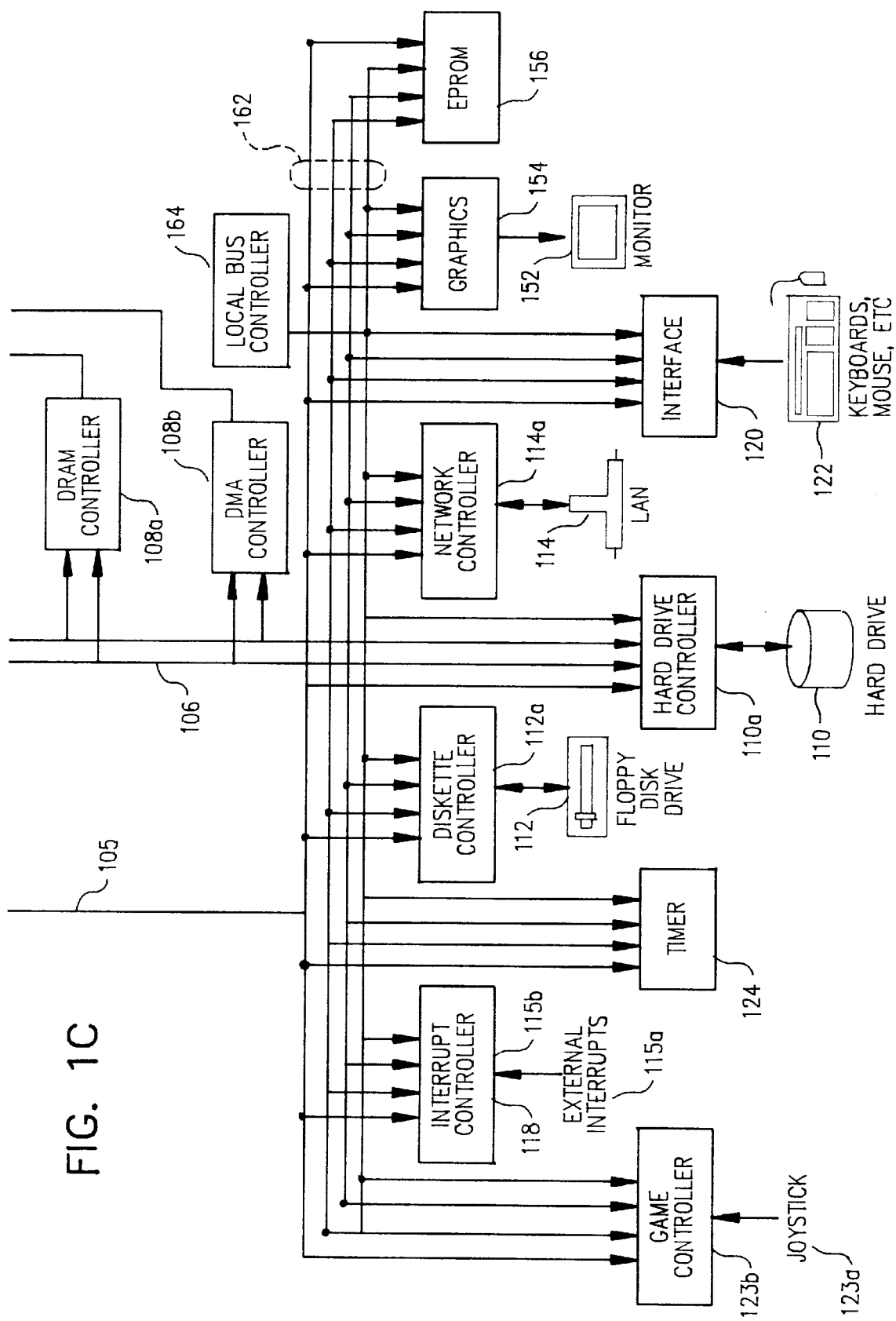

FIG. 1 depicts components of a computer system generally of the type known as a 486 computer. As shown in FIG. 1, the computer system includes a microprocessor 102 coupled to a plurality of controllers and peripherals, which are optional, depending on the system configuration. The microprocessor includes a bus interface 104 for interfacing with, e.g., mass storage units and peripherals. An address drivers 104a provides proper addresses on the address bus of the proper level for storing and transmitting information including program information and data to and from a conventional memory, such as dynamic random access memory (DRAM) 108, e.g., via a DRAM controller 108b or a direct memory access (DMA) controller 108b, or to and from a hard drive 110, via a hard drive controller 110a or a floppy drive 112 via a floppy drive controller 112a, or to or from network storage over a local area network (LAN) 114 via a network controller 114a or to or from other data sources and sinks such as remote devices, e.g., via a modem (optional), e.g., for Internet access or communications with other network systems, a mouse or keyboard 122, via keyboard interface 120, or a joystick 123a via a joystick or game card or controller 123b.

Traffic on the bus is controlled using, e.g., a bus control request sequencer 104b, a bus burst controller 104c, and a bus width controller 104d. Accuracy of communication is checked using a parity generator and controller 104e. A cache memory 116 controlled by a cache unit 116a and communicating via a cache controller 116b provides for wait-state-free access to conventional memory 108. The cache memory 116 is smaller than conventional memory 108 but has much shorter access time. It is controlled in such a way as to be likely to contain the information which will be needed by the processor on a relatively short time frame. The mixed instruction and data cache 116 provides a buffered write-through to ensure data in the conventional memory is current. Transfer of data to and from the cache memory occurs in burst mode using the burst controller 104C.

The bus 103 consists of a control bus 105, an address bus 106, and a data bus 107. Interrupts from external devices are controlled by an interrupt controller 118 and passed to the microprocessor 102. A keyboard interface or controller evaluates user input received from the keyboard or other input units, such as a mouse, pen and the like, and issues a corresponding signal to the keyboard interrupt of the computer. The keyboard controller receives serial data from the keyboard cable and stores the data temporarily for delivering them to the CPU 102. A timer 124 generates timing signals for the interrupt controller 118 and the system clock.

In order to provide access to a large range of memory locations, program instructions typically employ logical addresses. In order to access the correct memory location, either from the cache 116 or, if necessary, by retrieval from conventional memory 108, it is necessary to convert the logical address into a physical address. In the depicted embodiment, a word has a logical address with three components: a segment address, a page address, and a displacement address. A segment table 130 contains, for each segment, a pointer to the base of the corresponding page table. The page table 132 is a memory map which, for each logical page address, contains a corresponding physical address of a page in main or secondary memory. To speed up the address translation process, part of the memory map is replaced by a high speed memory, the translation lookaside buffer (TLB) 134. A logical address is, thus, transformed by the segment table 130 and page table 132 or TLB 134 into a physical address for transmission over the physical address bus 136 to the cache.

In order to assure that the CPU 138 (including a barrel shifter, a status register and an arithmetic/logic unit (ALU)) can receive a constant stream of instructions, an instruction or command memory 140 is provided, coupled to a prefetcher 142 for fetching the next instruction for the queue. Commands from the queue are provided to a command decoder 146 which decodes the macro instructions to provide decoded instructions or micro instructions. A control and protective unit, including a control read only memory (ROM) 148 provides control signals to control flow of data and instructions to the CPU 138. When an instruction requires floating point arithmetic, the instruction is provided to a math co-processor unit or floating point unit (FPU) 150.

Graphic output is displayed on a computer screen or monitor 152, such as a VGA or SVGA monitor via a graphics card 154. Read only memory, such as erasable programmable read only memory (EPROM) device 156 is used for storing nonvolatile and/or permanently programmed information. Typically, for a 486 computer, a set of instructions for organizing basic functions such as accessing peripheral devices and mass storage, initial boot-up of the computer and the like, such as that known as the basic input/output system (BIOS) is stored on read only memory device 156. Additional system instructions, such as a disk operating system (DOS), e.g. Microsoft® DOS 6.2 are stored typically on the hard disk 110 or floppy disk drive 112. Additionally, in a typical system, a user interface such as a graphical interface like Microsoft® Windows is stored on the hard drive 110. Communication among the peripheral units over a local bus 162 is controlled by local bus controller 164.

Application programs typically can be stored on the hard drive 110 or a floppy disk 112 and work in cooperation with the BIOS and system program, such as DOS, e.g. for transferring data and instructions to and from the hard drive 110 to the conventional memory 108, cache memory 116 and/or CPU 138. Preferably, the application program works in cooperation with the user interface program such as Microsoft® Windows for controlling display of output on the monitor 152, e.g. in full screen mode or windowed mode, multi-tasking the application program with other computer operations and/or receiving user input, e.g. via the keyboard, mouse, etc. 122 and transmitting the input to the CPU for controlling operation of the application program.

There are several ways in which the computer may communicate with external or peripheral devices. One method of communication involves issuing from the main microprocessor an escape command (e.g., for sending certain information to a printer). A second method involves sending information to a memory which can be accessed by peripheral devices. A third method involves communication to and from a port. When data is to be obtained from an external device via a port, the computer will place any necessary commands on the command bus, and place the port address on the address bus. Thus, the various port addresses occupy a certain amount of the address space of the computer. A programmer may retrieve data from a port by using assembly language commands, and/or by invoking various basic input/output system (BIOS) functions, e.g., by issuing commands in a higher-level programming language such as C or Basic.

By convention, the address assigned to the gameport is $0201h$. In order to connect an external device such as a joystick to the gameport, e.g., for providing communication from the joystick via the gameport to the computer, in addition to assigning a logical address to the gameport, it is also necessary to provide physical devices for achieving the connection. The physical devices typically include a plug, such as a female D15 standard plug, and interface circuitry. The interface circuitry or adapter performs a number of functions, including recognizing the gameport address when it is placed on the address bus, responding to a command such as a write command or read command while the gameport address is asserted, such as by closing one or more logical switches (as described more fully below), conditioning various signals (e.g., to provide logical signals at the correct voltage for placing on the data bus), and controlling timing of various operations, as described more fully below. In some cases, the plug and the interface circuitry are placed on an expansion board for installation in the chassis of the computer in the normal fashion. One type of such board is a "gameport card," designed exclusively for connecting joysticks. Some "soundcard" expansion cards include a gameport. Another type of card is a multiple-I/O card, which typically includes, in addition to the gameport plug and associated interface circuitry, several other interfaces such as a parallel interface and one or more serial interfaces, with associated plugs (or "jacks"). In some computers, the plug and interface circuitry making up the gameport are built into the computer, rather than being located on an expansion board.

There are typically two general modes of communicating with the microprocessor: polling and interrupt. In a polling system, the microprocessor issues commands at times determined by a computer program, for requesting data from an external device. In an interrupt system, an external device can issue an interrupt signal 115a to an interrupt controller 115b. At an appropriate-time, the interrupt controller 115b provides an interrupt signal onto the bus 103 which is eventually recognized by the microprocessor, which then suspends or interrupts the normal processing, and executes an interrupt handler routine. In most cases, data through the gameport is handled using a polling procedure. In a few cases, gameport data is handled by an interrupt procedure, such as by making use of a software BIOS call to $0015h$.

Most joysticks used in connection with desktop computers are either a switch type or an analog type. An analog (or "proportional") joystick provides information regarding the amount of deflection of the joystick in left-right, and/or fore-aft directions (or combinations thereof). In a switch type joystick, movement of the joystick to the left issues a "left on" signal, movement to the right issues a "right on" signal, movement forward issues an "up-on" signal, and movement aft issues a "down-on" signal. Thus, the switch-type joystick provides no information regarding the amount of movement left, right, up or down, but only the presence of absence of movement. For this type of joystick, movement in a diagonal direction can result in two of the four switches or signals "on."

Some software is intended to receive input from a specialized switch device such as a game pad. In typical switch input devices, the number of switches or buttons is dependent on the number of registers (or other storage hardware) which are available in the device. For example, a 12-button Super Nintendo® style game pad can store 16 bits (e.g., by using a 16 bit shift register or two-cascaded 8 bit shift registers). In the device, there are 8 push buttons and 4 directional controller inputs (up down, left right) for a total of 12 switch bits. In this type of device, as in other "switch" type controllers, diagonal movement can be indicated through simultaneous depression of two directional movement buttons.

Some game software is configured to receive other types of switch inputs such as switch inputs from a keyboard. However, switch input is believed to be unsatisfactory for many game and other applications, e.g., because of the need to provide multiple switch input (e.g., multiple depression of arrow or other keys) or holding down of a key in order to achieve multiple or continued movement information. Moreover, not all keyboard ports are standard. Devices for use with a keyboard port tend to be expensive, provide only limited response, especially for proportional controllers, and typically require separate analog control systems.

Some software such as game software is configured to receive input from a mouse device. However, a mouse device does not provide the same type of tactile user interface experience as a joystick. Moreover, software which is configured to receive input from a switch device, keyboard or mouse, is specifically written for that type of input and these types of input devices cannot, without modification, be used for or in conjunction with the software written for receiving input through a gameport.

Other ports commonly provided on computers have drawbacks if they are used for communication from devices of the type typically coupled to a gameport. For example, a serial port typically does not provide sufficient power to support many types of joysticks or other external devices (which often require four to five mA per device). Very often, all serial port devices are already occupied for other uses. There is a potential for IRQ conflicts (e.g., arising from an internal modem). Serial ports provide limited compatibility and, often, do not provide sufficient speed of data transfer (sometimes being limited to, e.g., 9600 baud). Furthermore, use of a serial port would normally require custom driver software.

Parallel ports of the type typically provided on computers, also do not provide sufficient power, are likely to be subject to IRQ conflicts (e.g., with sound cards), would typically require custom driver software, and provide no inherent compatibility. Furthermore, using a parallel port to communicate with devices of the type normally connected to a gameport, may cause conflict with the printer.

FIG. 2 depicts one configuration for connecting joysticks to a computer. In the embodiment of FIG. 2, the computer 202 includes a D15 plug 204, coupled to interface circuitry, e.g., a "game control adapter" to establish a gameport. In the embodiment of FIG. 2, each of two joysticks, joystick A 206a and joystick B 206b, includes a base 208a, 208b, a control stick 210a, 210b, and two user-activatable buttons 212a, 214a, 212b, 214b. The joystick 206a can be, for example, a joystick as described generally in U.S. Pat. No. 5,113,179 issued May 12, 1992, commonly assigned herewith and incorporated herein by reference. A multi-wired cable 224 connects the joysticks 206a, 206b to the plug 204. In some cases, a Y-adapter cable (not shown) is provided for coupling both joysticks 206a, 206b single D-plug 204. In the embodiment of FIG. 2, the cable 224 includes a line 226a for providing an analog signal, indicating the position of the stick 210a, along the left-right (or "X") axis, a line 226b for providing an analog signal, indicating the location of the control stick 210a, along a fore-aft (or "Y") axis, a line 226c for providing information regarding the state of the first button 212a, a line 226d for providing information regarding the state of the second button 214a, and corresponding lines 226e–226i for the second joystick 206b. Other lines (not shown in FIG. 2) are used to provide voltage and ground, as shown in Table 1.

TABLE I

Multi-I/O card gameport adapter pin layout

| Pin | Type | Signal |
|---|---|---|
| 1 | Output | +5 Volts |
| 2 | Input | Button 1 Joystick A |
| 3 | Input | x-value Joystick A |
| 4 | Output | Ground |
| 5 | Output | Ground |
| 6 | Input | y-value Joystick A |
| 7 | Input | Button 2 Joystick A |
| 8 | Output | +5 Volts |
| 9 | Output | +5 Volts |
| 10 | Input | Button 1 Joystick B |
| 11 | Input | x-value Joystick B |
| 12 | Output | Ground |
| 13 | Input | y-value Joystick B |
| 14 | Input | Button 2 Joystick B |
| 15 | Output | +5 Volts |

The voltage and ground voltages are output by the computer for use by the joysticks 206a, 206b. In previous devices, however, information was always used in a manner such that the information flow was from the joysticks 206a, 206b to the computer 202. From previous devices, there was no communication of information in the opposite direction, in the sense that previous external devices coupled to one gameport did not use information output through the gameport.

FIG. 3A depicts another common configuration in which only a single joystick 306 is coupled to the computer 202 via the plug 204. In the embodiment of FIG. 3A, the joystick 306 includes four buttons 312a, 314a, 316a, 318a, in the embodiment of FIG. 3A, lines 226a–226d are used in the same manner as the use of these lines depicted in FIG. 2. The signals from the two additional buttons 316a, 318a are provided over lines 226h and 226i. In the embodiment of FIG. 3A, lines 226e and 226f are not used.

Figure 3B:
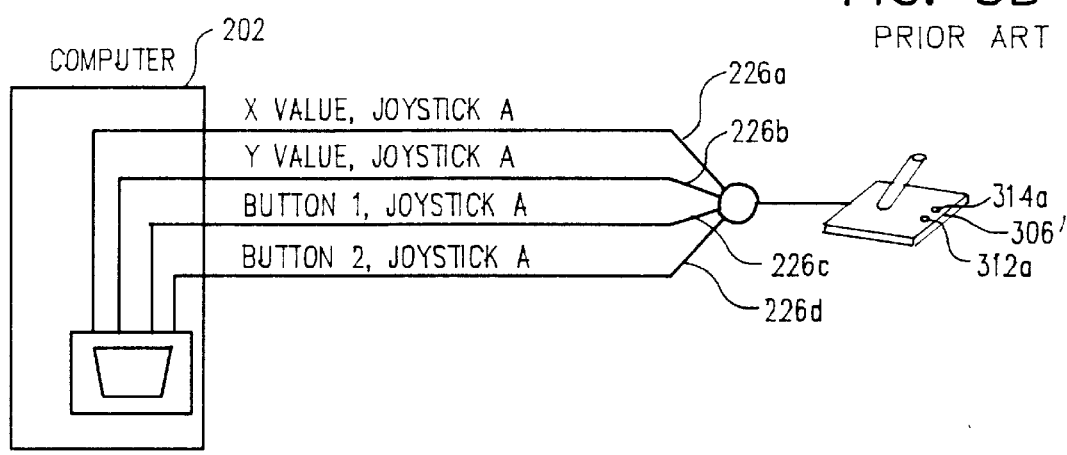
FIG. 3B is a block diagram depicting coupling of a two-button joystick to a computer via a gameport according to previous devices.

Other variations on the configuration of FIGS. 2 and 3A are also used. In some cases, the interface for FIG. 3A is configured to handle only signals over lines 226a–226d, and the pins for connecting to lines 226e–226i are not connected to any circuitry, as depicted in FIG. 3B.

Figure 4A:
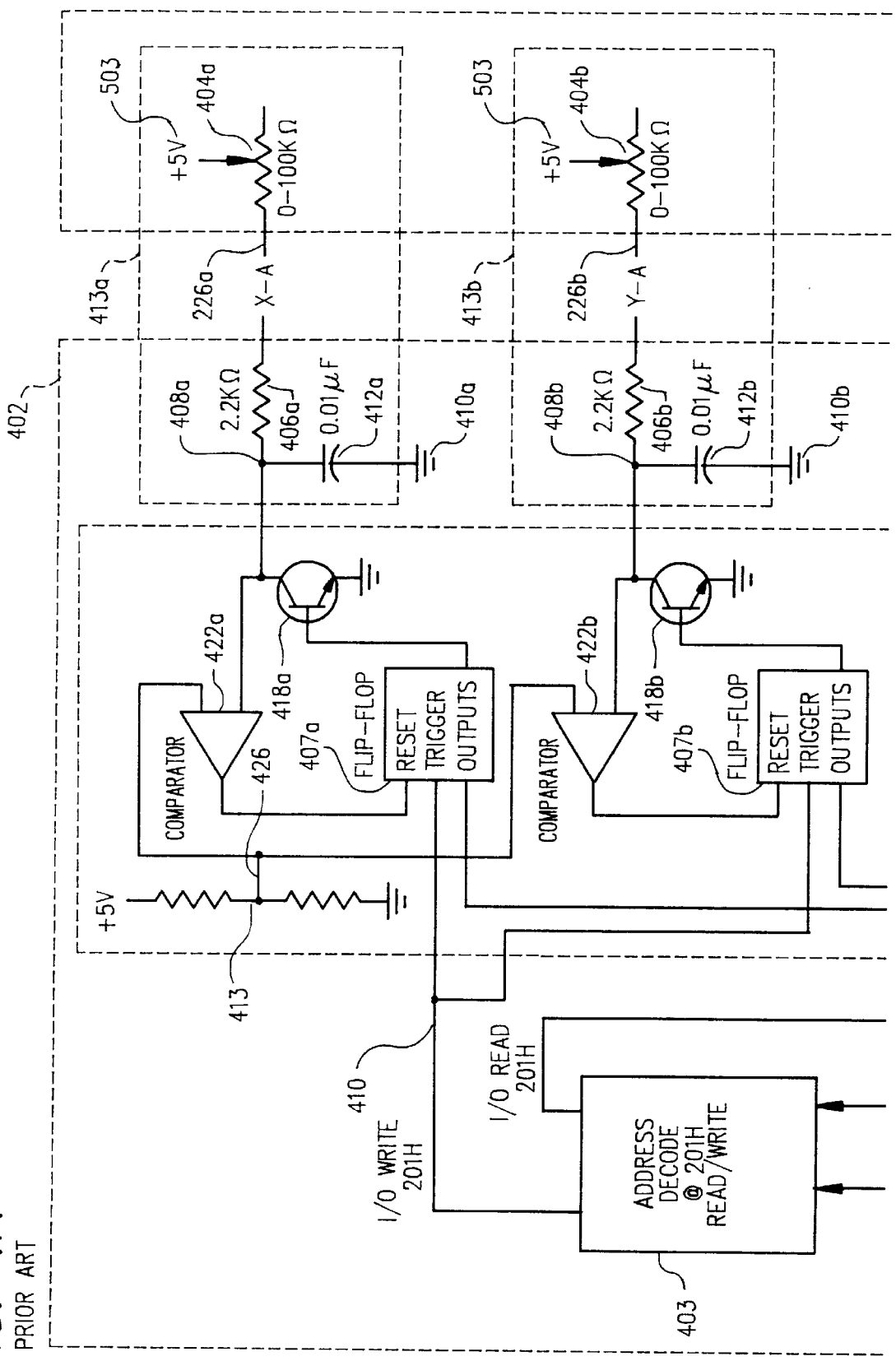
FIG. 4 is a schematic diagram of the equivalent circuitry for a joystick coupled to a game controller according to previous devices.
Figure 4B:
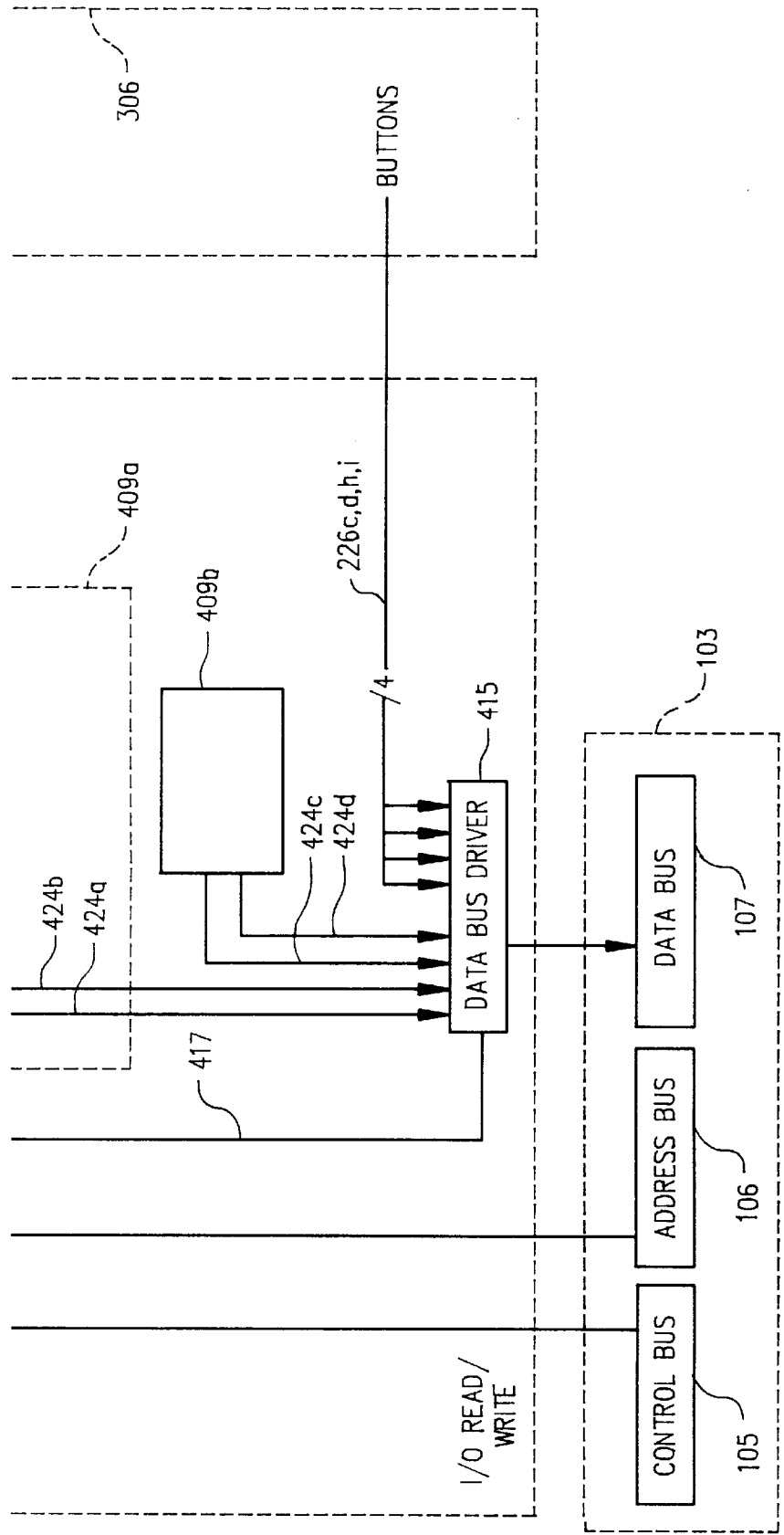

A description of one type of gameport interface is found in U.S. Pat. No. 5,230,059, incorporated herein by reference. For purposes of explaining advantages of the present invention. FIG. 4 depicts, in simplified form, circuitry equivalent to that of a joystick 306 coupled to a gameport interface circuit 402. The joystick 306 provides two variable resistors which are variable through the range of 0 to 100 kilohms 404a, 404b. These resistors 404a, 404b are coupled via lines 226a, 226b to resistors 406a, 406b, such as 2.2 kilohm resistors. Nodes 408a, 408b are connected to ground 410a, 410b via capacitors 412a, 412b, such as 0.01 microfarad capacitors. Thus, a first RC circuit 413a is made up of capacitor 412a, resistor 406a, and variable resistor 404a, and a second RC circuit 413b is made up of capacitor 412b, resistor 406b, and variable resistor 404b. The time constants for the two RC circuits will depend on the resistances of the variable resistors 404a, 404b.

In practice, information about the current location of the stick 210a is obtained as follows: The computer places a write command 502 on the control bus 105 at the same time that the address for the gameport 0201h is asserted on the address bus 106. In response, a decoder circuit 403 recognizes the address and, in response to the presence of the write signal 502, places a voltage on trigger line 410. This has the effect (via flip flops 407a, b of opening normally-closed switches such as transistor switches 418a, 418b. When the switches 418a, b are closed, voltage 503 is shunted to the ground. When the switches 418a, 418b are opened, the voltage on lines 226a, 226b, begin rising towards a maximum value of 5 volts. The amount of time required for the rise to a given voltage, depends on the RC constant of the respectively coupled RC circuits 413a, 413b, and thus depends on the value of the variable resistances 404a, 404b.

Figure 5:
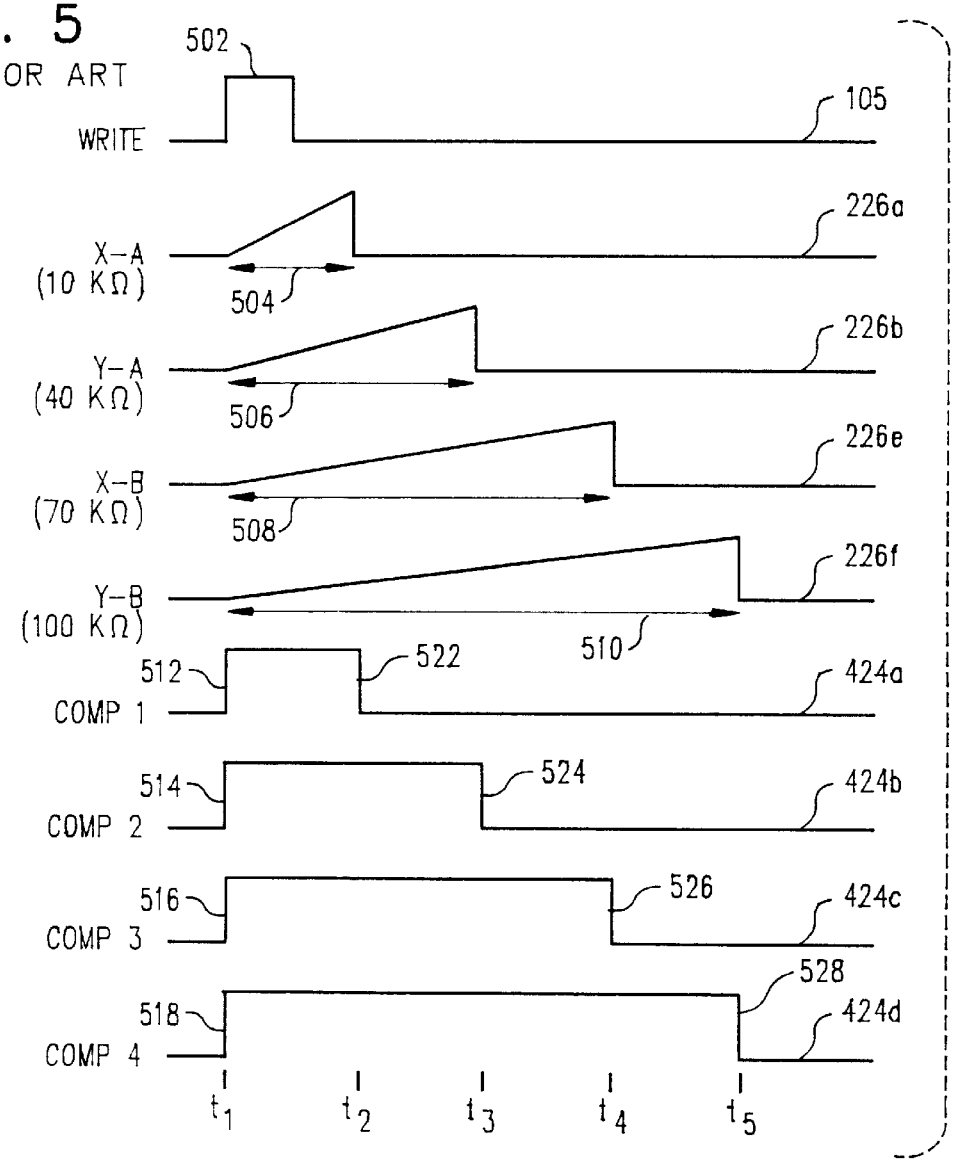
FIG. 5 is a timing diagram of signals of a type provided in connection with the circuitry of FIG. 4.

FIG. 5 presents an example in which resistor 404a is approximately 10 kilohms, and resistor 404b is approximately 40 kilohms. Circuitry similar to circuitry 409a is provided for a second joystick, when present, as depicted in FIG. 2. FIG. 5 shows signals that would result when the second joystick has an X-axis variable resistor set to about 70 kilohms, and a Y-axis variable resistor set to about 100 kilohms. As can be seen from FIG. 5, the amount of time which is required for the voltage on line 226a to reach a maximum value 504 is less than the amount of time required for voltage on line 226b to reach maximum value 506, since resistor 404a is set at only 10 kilohms, while resistor 404b is set at 40 kilohms.

Information about the state of lines 226a, 226b are provided by first and second comparitors 422a, 422b, over lines 424a, 424b via flip flops 407a, 407b. To accommodate the second joystick, similar circuitry 409b is provided for outputting indications of the X and Y line states for this joystick, e.g., over lines 424c, 424d (FIG. 5). When the trigger signal is asserted on line 410, the comparitors 422a, 422b are set to output a high (logical 1) level 512, 514, 516, 518. The comparitor 522a, 522b will remain at the high or logical 1 level until the signal at node 408a, 408b, is equal to a threshold voltage 426, established by voltage divides 413, which may be, e.g., 3.14 v. Thus, at time T2, voltage on line XA 226a reaches five volts, and a comparitor 422 causes the level on line 424a to drop to zero, or to a logical zero level 522. Similarly, at times T3, T4, and T5, respectively. When the values on lines 226b, 226e, 226f, respectively, reach their maximum values, the levels on lines 424b, 424c, 424d, respectively, drop to zero 524, 526, 528. The values on the four lines 424a–424d thus provide, at any one time, a four-bit output which can be placed on the data bus 107 by driver 415. In one embodiment, the computer obtains this data by issuing a read command to the gameport address 0201h causing decoder 403 to output a signal 417 to the driver 415. In order to have sufficient discrimination to determine, for each line 226a, 226b, 226e, 226f, how long was required to reach the threshold voltage, the read commands must be issued by the microprocessor, with relatively high frequency until all four lines 424a, 424b, 424c, 424d have returned to the logical zero state. By determining the amount of delay from the issuance of the write 502 until a given one of the lines 424a, 424b, 424c, 424d returns to the zero state, the computer can deduce the left-right and fore-aft position of the sticks 210a, 210b, in a manner that will be understood by those of skill in the art. As noted above, in many systems, during the period that the microprocessor is issuing read commands to discern where the lines 424a, b, c, d return to zero, it is infeasible for the microprocessor to perform other tasks, effectively monopolizing the computer during this time period. This situation results in low efficiency, i.e., a relatively small amount of data obtained compared to amount of time the CPU is effectively occupied in order to obtain this data.

FIG. 6 depicts a configuration according to an embodiment of the present invention. In the embodiment of FIG. 6, the boundary between the computer and external devices is represented by line 602. In this embodiment, the external device hardware is different from that depicted in FIGS. 1 through 5, but the computer hardware can be substantially the same as that provided in previous devices. In particular, the embodiment of FIG. 6 can be used in connection with a computer which has a standard gameport, i.e., a standard plug 204 and interface circuitry 123b. This is useful in order to provide backward hardware compatibility (i.e., to permit the present invention to operate in connection with the installed base of computers with gameports). The present invention may also be used in connection with new types of computers (either having conventional gameports or new types of gameport interfaces. e.g., as described below), special purpose electronic devices (such as game consoles) and the like. As described more fully below, some modes or manners of operating the present invention can be used in conjunction with existing software in the computer 202, while other modes or manners of operating the present invention are used in connection with new software (i.e., software different from that typically used in connection with gameports).

The embodiment of FIG. 6 differs in a number of ways from devices of FIGS. 1 through 5. In the embodiment of FIG. 6, data from joysticks is provided to the computer in multi-bit digitized fashion. In one embodiment, digitized data is provided to the gameport and, ultimately, to the data bus in a synchronous or clocked fashion. In this context, "clocked" does not necessarily refer to regular, periodic signals or events, but refers to transferring data at times determined by "clock" pulses whose occurrence is controlled by the computer. It is anticipated that, in most cases, the computer will be programmed to cause creation of such "clock" pulses at approximately regular intervals. e.g.. for "clocking out" data from shift registers, as described below.

In the embodiment of FIG. 6, four joystick devices 606a, 606b, 606c, 606d are coupled to the computer over the four lines 226c, 226d, 226h, 226i, respectively, which, in previous configurations, were used for providing button information. In the embodiment of FIG. 6, while lines 226c, 226d, 226h and 226i are used for conveying information to the computer 202, lines 226a and 226b are used to provide information from the computer, in the sense that the signals on lines 226a, 226b, are initiated, ultimately, by the computer 202, but are used by external or peripheral devices coupled to the gameport.

In the embodiment of FIG. 6, the joystick devices 606a, 606b, 606c, 606d are each provided with controller circuitry 608a, 608b, 608c, 608d. The controller circuitry, among other functions, digitizes (e.g., for temporary storage such as in registers or other memory), information indicating the position of the joystick handle 610a, 610b, 610c, 610d, and buttons 612a–d, 614a–d, 616a–d, 618a–d, in a manner described more thoroughly below. Thus, at any given time, the register or memory in the controllers 608a, 608b, 608c, 608d contain information indicative of the present state of the respective control sticks and buttons.

When the computer issues a command, e.g., a write sent to 0201h, (as described more thoroughly below) for obtaining data from the joysticks, signals are sent to signal conditioning circuitry such as circuitry 622, which, in the embodiment of FIG. 6, is located in an expansion box 624. The signal conditioning circuitry 622 outputs a load signal to the joystick device 606a, 606b, 606c, 606d. In response, the controller 608a–608d loads the current stick and button information into one or more output registers, which may be located in the expansion box 624' (FIG. 9) or on the joystick. Information from the output registers is then output serially (clocked out) e.g., on lines 226c, 226d, 226h, 226i, respectively. In one embodiment, clock signals for clocking out data from the registers is derived from write commands sent by the computer to gameport address 0201h.

Figure 7A:
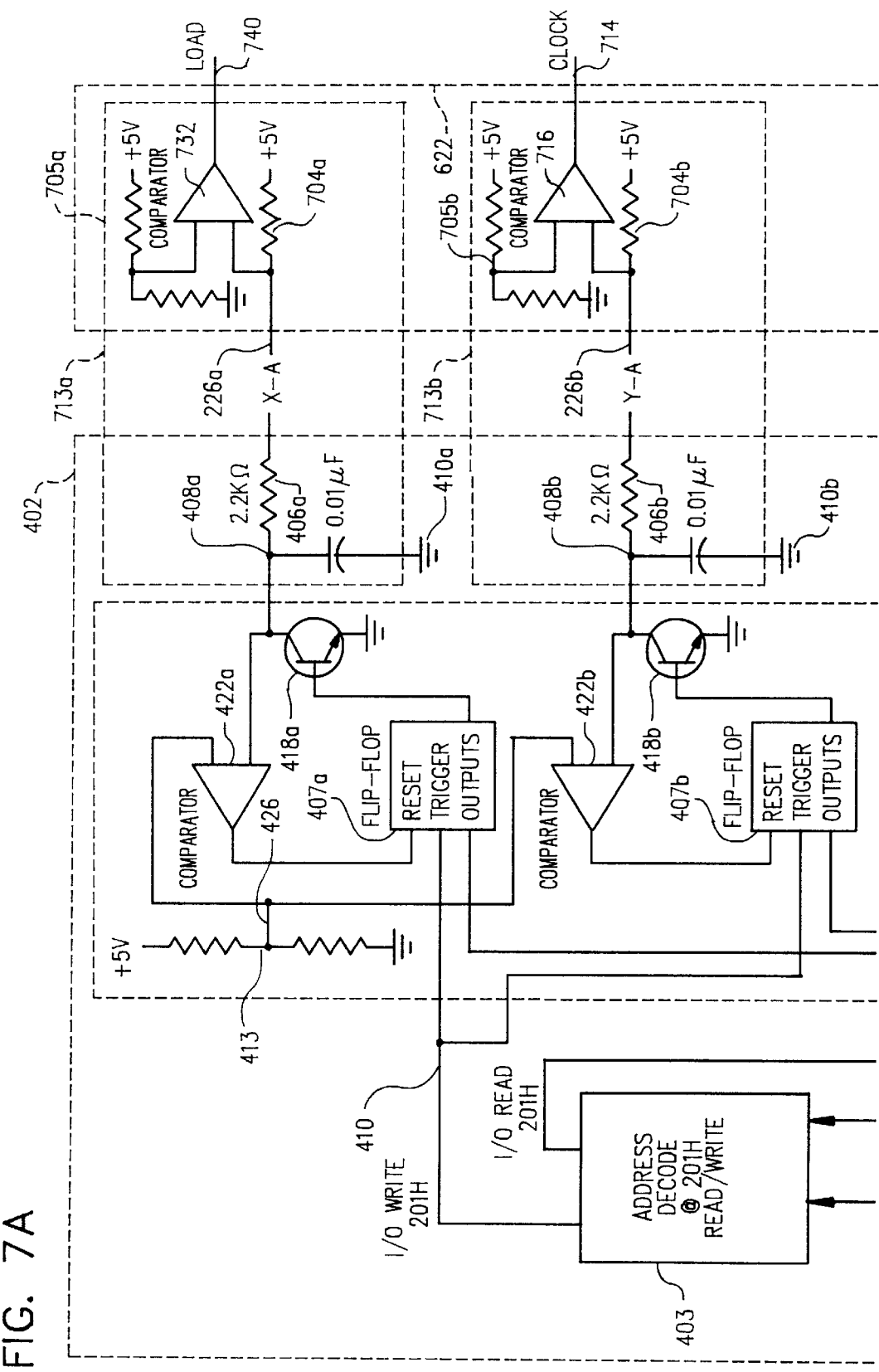
FIG. 7 is a schematic diagram of an equivalent circuit for providing load and clock signals, as shown in FIG. 6.
Figure 7B:
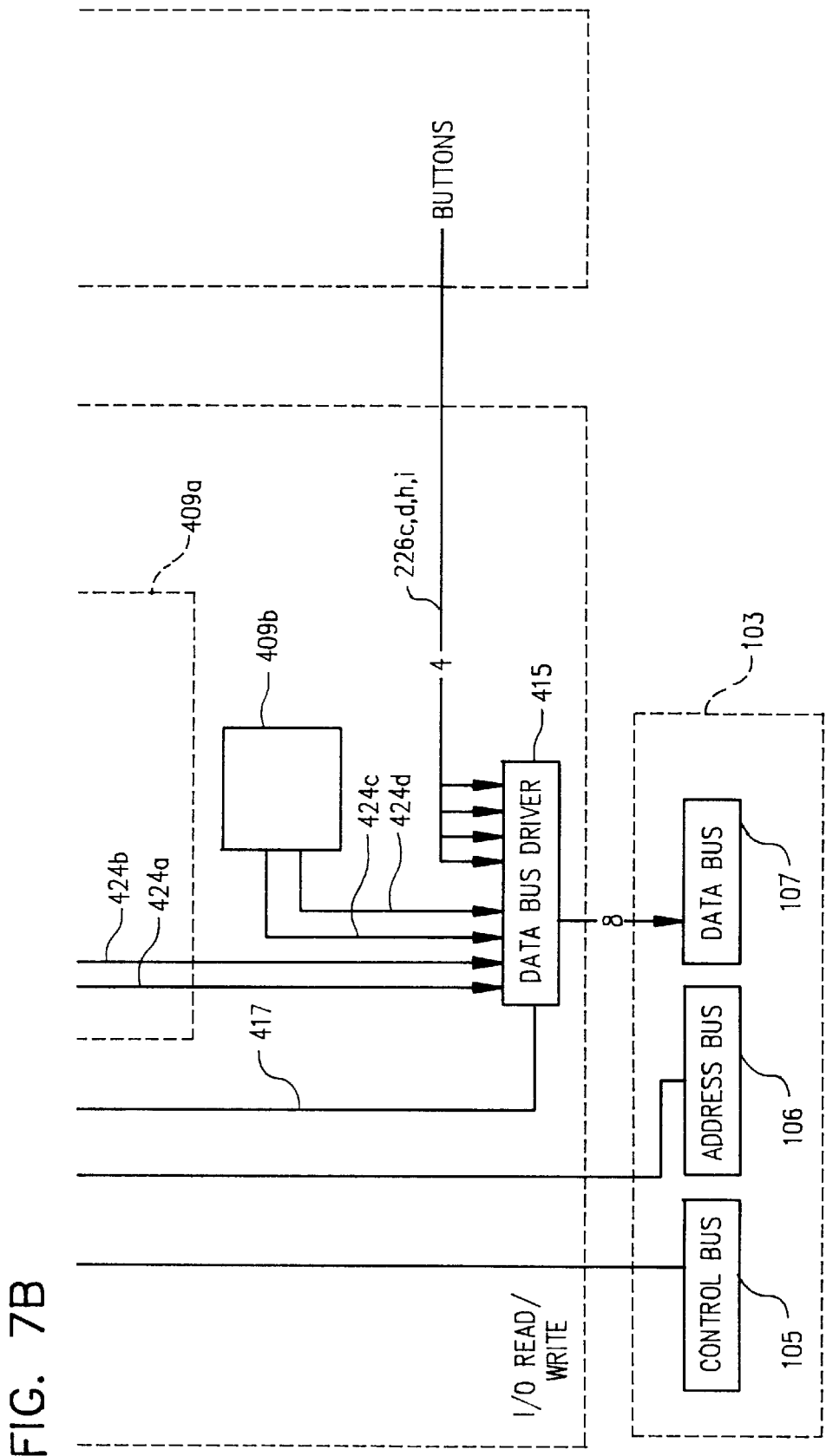

In order for the embodiment of FIG. 6 to operate in a fashion which is backwards-compatible, a number of features or aspects of previous devices are retained. As in the previous devices, the configuration of FIG. 6 responds to a write or read signal sent to the gameport address (e.g., 0201*h*), and the present configuration provides an effective resistance on pins 3 and 6 of the D15 plug of the gameport, with a voltage on lines 226*a*, 226*b* between about zero and about 5 volts. Preferably, the expansion box communicates with the gameport by a cable having a male D15 plug for engagement with plug 204 to provide for compatibility with existing gameports. Preferably, new types of joysticks 608*a*–608*d* have output plugs which are different from D15 plugs to avoid inadvertently coupling a new type of joystick directly to a conventional gameport. If, however, devices are included for making the new type of joystick compatible with previous types of software, as described below, new-type joysticks 608*a*–608*d* could be provided-with a compatible D15 plug. Furthermore, because the present invention provides, to the gameport, analog signals on the analog lines and button signals on the button lines. FIG. 6 can operate in cooperation with the installed base of gameports, i.e., using gameports substantially identical to previous gameports 402 substantially without the need to modify gameports. In particular, as seen in FIG. 7, the signal conditioning circuitry 622 can be used in conjunction with interface circuitry 402 substantially identical to that of previous devices. Thus, external devices of at least some embodiments of the present invention are hardware-compatible with the installed base of gameports.

As shown in FIG. 7, the lines 226*a*, 226*b* are coupled to effective resistances 704*a*, 704*b*, which have a value selected to provide time constants as described below. Although, in the depicted embodiments, resistors 704*a, b* are fixed resistors, if desired, variable controllable or selectable resistances can be provided, e.g., for changing the respective RC time constants, and/or for calibration. A first RC circuit 713*a* is made up of capacitor 412*a*, resistor 406, and resistor 704*a*. A second RC circuit 713*b* is made up of capacitor 412*b*, resistor 406*b*, and resistor 704*b*.

With reference to FIG. 8, at time T1, digital data indicating the position and state of the control stick and buttons for each of the joysticks 606*a*–606*d*, have been loaded into shift resisters 870 by a process which will be described more thoroughly below.

At time T1 the computer 202 issues a write command to address 0201*h* (indicated in FIG. 8 by the negative-going edge 802 of the 0201*h* write signal 804. Decoding of this write signal results in a trigger applied to line 416, causing the opening of normally closed transistor switches 418*a*, 418*b*, i.e., turning off the ground-shunting transistor and allowing both the X-A capacitor 412*a*, and the Y-A capacitor 412*b* to charge. The value of resistor 704 is selected such that the time constant of RC circuit 713*a* is relatively long (e.g., about 20 milliseconds or more), providing for a relatively long period 806 required for line 226*a* to "time out" (i.e., reach a threshold voltage, e.g., of about 3.15 v). Since lines 226*a*, 226*b* are not retriggerable, both axis lines 226*a*, 226*b* will continue charging normally until reaching a maximum voltage.

It is assumed, in the following description, that valid data has already been latched in the shift register 870. Initially, the first write to address 0201*h* will cause the first load to occur about 20 milliseconds later, through a process that will be understood by those of skill in the art from the description below, of normal (non-initial) register loads.

Waveform 812 shows the signal level changes which occur with a read from address 0201*h*, which indicates charging of the X-axis line 226*a*. Before line 226*a* times out, when the charge on line 226*a* begins increasing, but is below a threshold voltage defined by voltage divider 705*a*, e.g., 3.14 v, comparitor 732 causes a transition of 738 of the load signal 740 to a high or logical one state. When the line 226*a* times out, i.e.. reaches the threshold voltage, comparitor 732 causes a high-to-low transition 746 of the signal 740, signaling the end of the read data timer 806. At this time, bit zero 812 (i.e., the output from flip flop 407*a* placed on the first of the eight data bus lines 107 when a read at 201*h* occurs) transitions to a low level 752. The negative-going edge 746 of the signal at the end of the read data timer 806 indicates that the data, having already been latched, is ready for output to the computer.

The resistor 704*b* is selected to have a relatively small resistance to provide a relatively short time 808 to reach the threshold voltage on line 226*b* established by voltage divider 705*b*. When the voltage on line 226*b* begins increasing and/or reaches a predetermined level, comparitor 716 causes a low-to-high transition 712 on the clock line 714. When the voltage on line 226*b* reaches a threshold value, comparitor 716 causes the clock line 714 to transition 722 to a low, or logical zero level, hence completing a clock cycle. Whenever a 0201*h* write is performed at a time that the voltage on line 226*b* is low or zero, a similar clock signal may be triggered. As can be seen from FIG. 8, each time the computer generates a write signal to address 0201*h*, while line 226*b* is in the low state, a clock signal is output on line 714. Thus, the present configuration allows the computer 202 to effectively output clock signals through a gameport to external devices such as joysticks. e.g., for purposes such as those described below.

While data is being clocked out of the shift register 870, in response to clock pulses 714 provided to a shift enable input of the shift register 870, the X-A axis line 226*a* will again be charging 832 in preparation for the generation of the next load signal, which will typically occur about 20 milliseconds after the first write to address 0201*h* 854, which occurs after the timing out of the previous A-X axis signal 856.

After the timing out of the A-X axis 856, causing the load signal to also fall low 746, the first data bit D0, 862*a*, is present at the serial output 626 of the shift register 870 for each of the joystick controllers 608*a*, 608*b*, 608*c*, 608*d*. In response to each clock signal 714, a bit is shifted out from the shift register 870 onto output line 626*c*.

In this way, the analog signal conditioning circuitry 622 detects when a write to address 0201*h* was generated by the computer 202 since this is reflected by an increase in the voltage on line 226*b*. As described above, in a response to such a write to 0201*h*, the signal conditioning circuitry 622 generates a clock pulse 714 to shift out the next data bit in the shift register 870. With each clock signal 714, one bit of data is shifted from each of the controllers 608*a*, 608*b*, 608*c*, 608*d* onto lines 626*c*, 626*d*, 626*h*, and 626*i* respectively. Although these lines could be provided directly to the gameport plug 204, in the depicted embodiment, they are provided to the expansion box 624 which couples these lines to lines 226*c*, 226*d*, 226*h*, 226*i* connected to the gameport plug 204. In one embodiment, signals on lines 226*c*, 226*d*, 226*h*, 226*i*, are provided directly (with only the necessary signal conditioning) to the data bus 107. Thus, the computer can retrieve the data by reading the digital values on the data bus after each generation of a write signal to address 0201*h*.

Figure 8A:
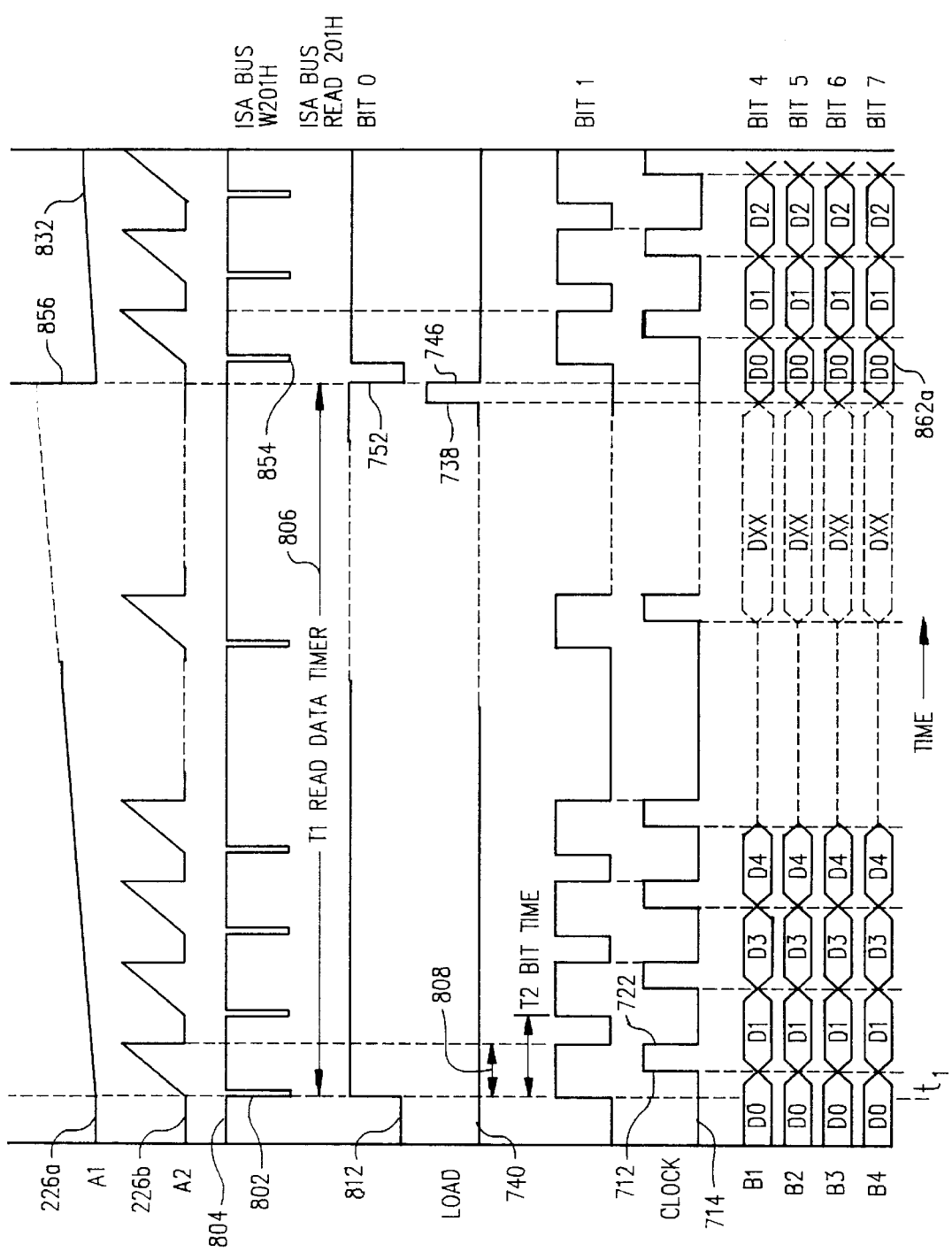
FIG. 8A is a timing diagram showing the relative timing of signals according to the embodiment of FIGS. 6 and 7.
Figure 8B:
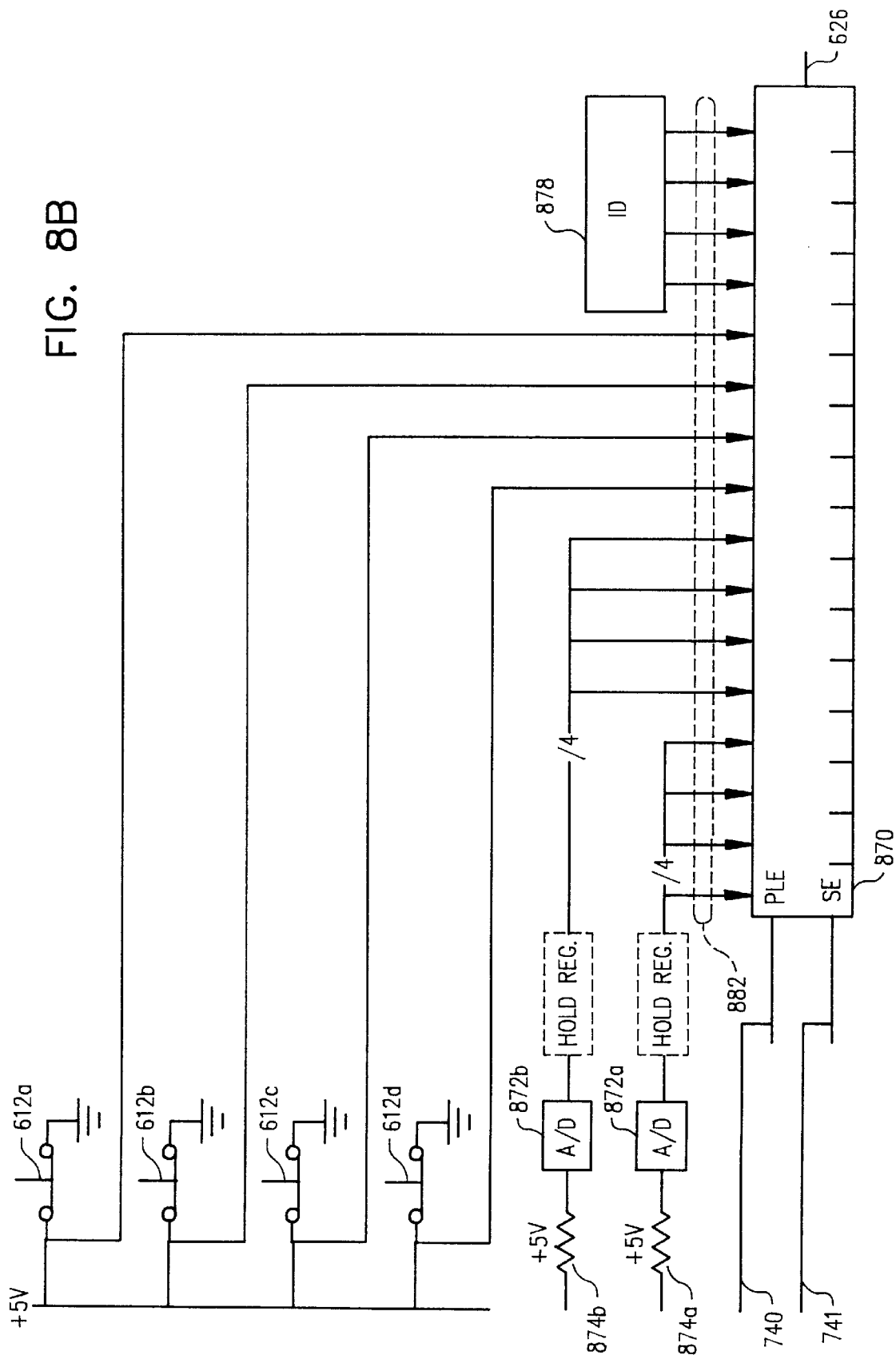
FIG. 8B is a block diagram of shift register and coupled circuitry.

In the embodiment depicted in FIG. 8B, register 870 holds 16 bits of data, four bits provided by analog-to-digital converter 872*a*, representing the value of variable resistor 874*a*, and thus, the X-axis position of the control stick 610*a*.

A similar configuration 874b, 872b provides a four-bit indication of the Y-axis position of the control stick 610a. Push buttons 612a, 614a, 616a, 618a, provide selection of 0 volts or +5 volts for storing bits into the register 870, indicating the depressed or undepressed condition of the buttons 612a–618a. If desired, hard-wired circuitry 878 or, e.g., non-volatile memory may provide a constant four-bit indication of the identity or type of joystick. Digital bits 882 are input in parallel to shift register 870, representing the digitized location of the stick 610 and status of the button 612a, 614a, 616a, 618a. The load signal 740, when applied to the parallel load enable input of the shift register 870, causes this data to be loaded, in parallel, into the shift register 870 for eventual clocking out onto line 626c in response to clock signal 714. Circuitry similar to that depicted in FIG. 8B is provided in the controller 608a, 608b, 608c, 608d of each joystick 606a, 606b, 606c, 606d.

The clock frequency 714 should not exceed the highest frequency at which the computer can retrieve data from the data bus, lest the apparatus output 2 bits of data when the computer can read only one. The frequency should be sufficiently high that all the desired data can be transmitted in a read cycle 806 which is sufficiently short that any lag between movement of the joystick or depression of buttons and the updating of status information in the computer is small enough as to be substantially imperceptible to the user. In one embodiment, data is provided at approximately one bit every 50 microseconds.

In some game cards or IDE I/O cards, only two button lines are operable (e.g. as shown in FIG. 3B). Thus, if an expansion box depicted in FIG. 6 is coupled with such a game card, data can be transmitted only over lines 226c and 226d. This would permit use of up to 2 new-style joysticks 606a, 606b using the communication protocol depicted in FIG. 8. As described below, by changing the protocol so that the read-data timer period 806 is longer and/or the clock frequency 714 is higher, greater bandwidth may be available over these two lines, e.g., for accommodating additional joysticks or other input devices. Thus, the present invention is compatible with previous hardware devices such as previous gameports which provide only two axis (analog) lines and/or only two button lines, although performance and/or capacity may be faster if the present invention is used in connection with a "full" gameport (having four button lines and four analog or axis lines).

Figure 11:
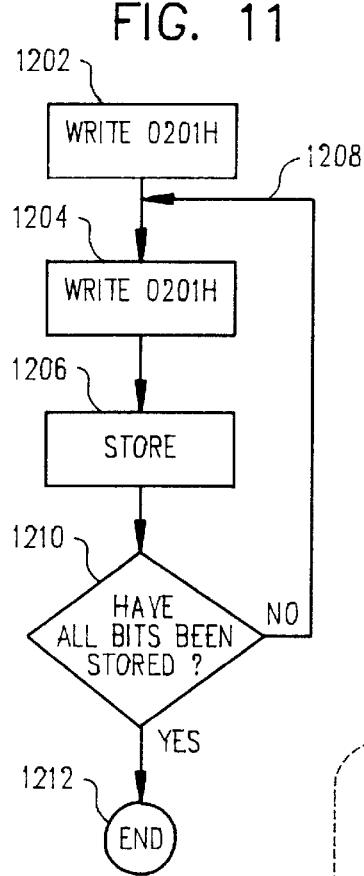
FIG. 11 is a flowchart of a procedure according to an embodiment of the present invention.
Figure 12:
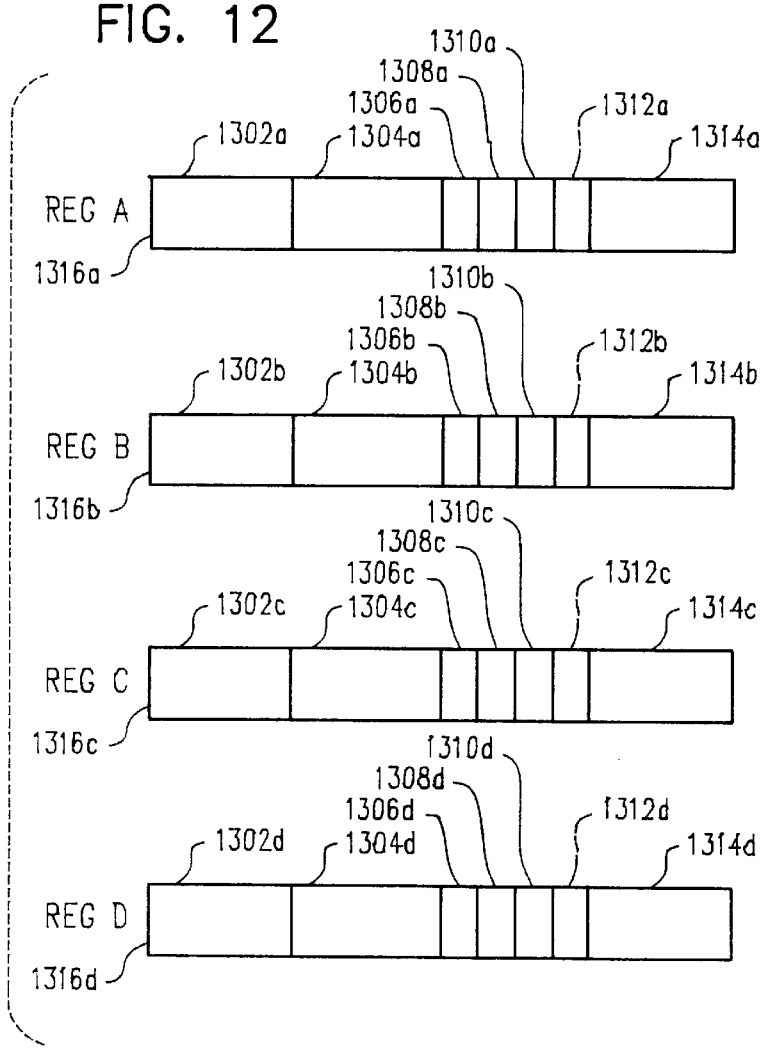
FIG. 12 depicts data storage in registers according to an embodiment of the present invention.

FIG. 11 is an overview of a manner in which the computer can be programmed to acquire data from joysticks configured as described above. The computer 202 first issues a write command to address 0201h 1202. This causes the signal conditioning circuit to output a load pulse 238 (and a clock pulse, which is not used at this time) which results in loading of data into the register 870 after about 20 microseconds. For example, in the embodiment of FIG. 9, in response to the load pulse, the microprocessor or other control device in the expansion box will fetch data from the joystick (which may reside in registers within the joysticks or may be available for output from the joysticks in a free-running manner) and load the data into shift registers, such as shift registers located in the microprocessor. The computer then issues a write command 1204 to address 0201h. This causes the signal conditioning to output a clock signal 712 which results in outputting or shifting one bit out of each shift register onto the four lines 626c, 626d, 626h, 626i and, ultimately, onto four lines of the data bus 107. These 4 bits of data on four lines of the data bus can be treated in a number of fashions by the computer. In the embodiment of FIG. 12, these bits are stored 1206, e.g. in registers within the computer such as registers 1302a, 1302b, 1302c, 1302d (FIG. 12). The write and store steps 1204, 1206 are repeated 1208 until all 16 bits have been shifted out of the registers 870 and stored 1210 at which point the acquisition of data from the joysticks 608a, 608b, 608c, 608d is complete 112. After completion of the procedure depicted in FIG. 12, the computer 202 will have stored four 16-bit words, e.g. in four registers of the computer, as depicted in FIG. 12.

In the embodiment shown in FIG. 12, the first four bits stored in each of the four registers 1302a, 1302b, 1302c, 1302d located in the computer, are four-bit digitized indications of the left-right axis location of the sticks 610a, 610b, 610c, 610d of the joysticks. The next four bits in the register 1304a, 1304b, 1304c, 1304d are four-bit digitized representations of the fore-aft axis position of the control sticks 610a, 610b, 610c, 610d of the four joysticks.

The next bit 1306a, 1306b, 1306c, 1306d of each register indicates whether each of the first buttons 612a, 612b, 612c, 612d is depressed. Similarly, bits 1308a–1308d indicate the status of the second buttons 614a–614c, bits 310a–310d indicate the status of buttons 616a–616d and bits 1312a–1312d indicate the status of buttons of 618a–618d. The next four-bits 1314a–1314d are a four-bit identification or signature of the identity or type of joystick 606a–606d. The data stored in registers 1316a, 1316b, 1316c, 1316d of FIG. 12 can be used for any purposes for which the joystick data was formerly used, such as controlling games or other software.

Figure 13:
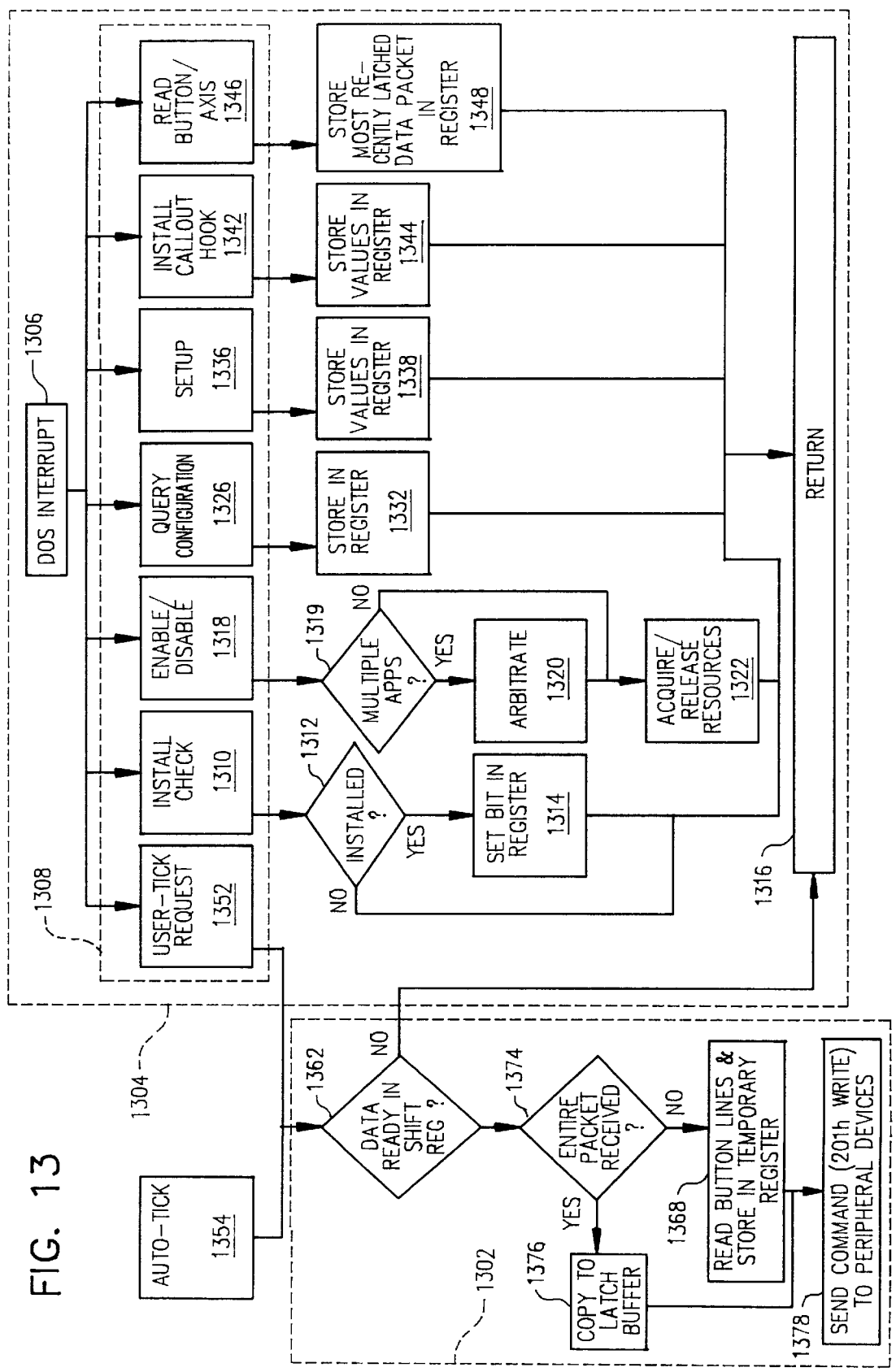
FIG. 13 is a flowchart of a procedure according to an embodiment of the present invention.

FIG. 13 depicts an embodiment of a device driver of a type which can implement the procedure presented, in overview, in FIG. 11. In the embodiment of FIG. 13, the device driver can be conveniently considered as including a hardware monitor 1302 and an application programming interface API 1304. The driver depicted in FIG. 13 provides an interface between applications, such as game software, which are configured for use with the apparatus described above, and the peripheral devices connected to the gameport, as described above. The driver of FIG. 13 can be installed as a terminate and stay resident (TSR) program, e.g., in the user's autoexec.bat file. The depicted embodiment provides an interface to applications by an interrupt handler. When an attempt is made to install the driver it first executes an installation procedure which checks to determine that the driver is not already installed and, if not, acquires any resources required by the driver, such as interrupts or timer hooks, as described below.

The API 1304 provides an application programming interface which is accessible to applications, such as game software, via a DOS Interrupt 1306. Preferably, software similar to that depicted in FIG. 13 can also be provided which is compatible with user interfaces and/or operating systems which do not use an interrupt such as Interrupt 15h. For example, Microsoft® Windows and OS/2® implementations preferably do not use an INT 15h-based calling convention. Instead, they preferably use the operating system's native calling conventions. Also, the driver will preferably use the operating system's native inter-device-driver communications mechanisms for the below-described, call-out hooks.

In the depicted embodiment, using a DOS Interrupt, the API 1304 can use, e.g., the existing BIOS joystick interface (INT 15h, AH=84h), e.g., with unused subfunction numbers (e.g., >80h). In the depicted embodiment, all parameters and return values are passed in registers. In one embodiment, the system uses the same registers that are used by the standard BIOS Joystick functions. By using registers, the driver can be called from DOS or from DOS extenders (such as DOS4GW), without the need for a special translation layer.

The API, as depicted in FIG. 13, is configured such that, in response to a DOS Interrupt 1306, the API 1304 will provide various services 1308 to the applications (e.g.. game software). which invokes or calls the API, such as by initiating a DOS Interrupt 1306. The installation check service 1310 determines whether the driver is installed in the system (e.g.. by calling interrupt 15h handler). If so, this information is provided back to the calling program by. e.g., loading certain resisters 1314 with specific constant bit patterns. Control is then returned to the calling program 1316. The enable/disable service 1318 is an arbitration procedure. An application, such as game software, must enable the device driver of FIG. 13 before it starts using its services and should disable the driver before exiting. The enable/disable service call 1318 is used by the driver to arbitrate between multiple applications and to acquire/release hardware resources.

The query configuration service 1326 permits applications to send a request for information about the nature of the attached peripheral devices such as the number of buttons, number of axes, and the like. These characteristics are then stored in a register for use by the calling program 1332.

The set-up service 1336 is used by the application program to set certain software switches or mode indicators in the driver software, e.g., by storing values in pre-determined registers 1338. For example, the application program may instruct the driver to switch between auto-ticking and user-ticking modes (described below).

The install call-out hook service 1342 is used to configure the driver such that other drivers in the system can request information. For example, by setting software switches, such as storing values in a register 1344, the driver can be configured to permit another driver to receive notification whenever there is a particular type of event occurring in the driver of FIG. 13. For example, another driver may wish to be notified whenever a complete packet is latched (as described below). This feature permits a programmer to write drivers which use the devices described above to emulate other standard PC devices. For example, using the install call-out hook feature, it would be possible to write a mouse driver which retrieved its positional information from an attached new-style joystick of the type described above, rather than from a mouse.

The read button states/axis positions 1346 service is used for an application to query the current state of a joystick controller stick/button position. The driver extracts information from the most recently read packet and returns the information to the application, e.g., in one or more registers.

The hardware monitor 1302 can be invoked in one of two ways, either by a periodic timer interrupt handler within the driver itself ("auto-ticking" mode) or by a plurality of "ticks," each of which is called directly by an application (the "user-ticking" mode). The user-tick request service 1352 is a request by the application program to perform the hardware monitor routine (as described below). In order to provide for sufficient frequency of data, an application should preferably be configured to issue a user tick request 1352 (by issuing the appropriate DOS interrupt 1306) at a high frequency, such as about 1 kilohertz.

If the driver is configured in auto ticking mode, an auto tick 1354 is periodically generated by the driver itself. When the driver is configured to use this auto ticking mode, the driver, in one embodiment, hooks to a periodic interrupt (such as IRQ8, which is the real time clock (RTC) interrupt, or IRQ0, which is the hardware timer interrupt). The driver installs an interrupt handler for this periodic interrupt.

Regardless of whether the tick is generated by the auto-tick mode, or as a user-tick request, the hardware monitor routine 1302 then proceeds as follows. It is first determined whether data is ready for shifting out of the shift register of the external device. For example, the software can make a determination whether there has been a time-out 856 on line 226a (causing a load signal 738), which has not yet been followed by a shifting-out of data from the shift register, such as by clock signals 714. If data is not ready (i.e.. has not been shifted out one step from the shift register onto the button lines), the routine immediately returns or exits 1364. If data is ready, the driver then checks to determine whether an entire packet of data has been received 1374. If so, the data is copied from a temporary buffer in the computer into a latch or application buffer 1376, such as the registers depicted in FIG. 12 (where the application can access the data). If the entire packet has not been received, the data on the data bus 107 (eight bits, in the embodiment of FIG. 7) which was output by the driver 415, i.e. the data provided over the button lines, is read and stored in the temporary buffer. Thus, at any one time, the application buffer will hold the most recently-obtained full packet of data, while the next packet is being accumulated in the temporary buffer (for eventual copying to the latch buffer, when transfer of the packet is complete). When the data has been stored in the temporary buffer or, as appropriate, copied to the latch buffer, the driver will send a command to the peripheral devices, i.e. in the depicted embodiment, a write to address 201h. This will cause either or both of lines 226a, 226b (if either has timed out) to begin charging, as depicted in FIG. 8A. The driver then returns 1316.

Several features of the hardware monitor routine 1302 should be noted. Preferably, the hardware monitor is designed so that the hardware monitor code 1302, which is called frequently (typically at about 1 kilohertz), typically in response to a hardware interrupt, has a short, preferably minimal code path, and can be executed with interrupts enabled. Preferably, the more computationally expensive work is delayed until the data is requested by the application, i.e., not during interrupt time. In order to effect low-overhead reads of the peripheral device, the driver issues the clock command 1378 at the end of the hardware monitor routine 1302, rather than at the beginning. In this way, data which is loaded as a result of the command 1378 sent during one iteration of the routine 1302, is available at the beginning of the next iteration of the routine 1302, and thus the driver does not need to "busy-wait" for data to become available. Thus the driver instructs 1378 the peripheral device to perform its (relatively-slow) load operation in the "background," while application code is being executed (i.e., between ticks). Because the driver does not need to idle while the-external device is loading new data, the overhead will decrease as CPU speeds increase (since more commands can be executed between ticks for higher CPU speeds) unlike conventional joystick routines which monopolize the CPU during polling and thus consume a substantially constant amount to real time, independent of CPU speed.

Although the embodiment of FIG. 13 is directed to a DOS implementation, it is possible to provide implementations for other user interfaces and or operating systems with appropriate changes. For example, under Microsoft® Windows and OS/2®, it is generally not advisable to directly hook the PC's hardware timers. However, both of these operating systems provide a timer-tick service to device drivers. The implementation of the auto ticking mode of this driver may be different under a non-DOS operating system. In particular, it may improve performance to execute multiple reads (e.g., multiple iterations of the hardware monitor code) in response to a single timer tick, rather than perform exactly one read per tick. Also, because of overhead of performing a context switch in non-DOS environments, it may be preferable to not support user ticking mode 1352 in certain non-DOS implementations.

It is believed that at least some implementations of a driver generally configured according to FIG. 13 can be successfully operated using only about 1% of CPU time on a computer operating at 33 Mhz and, about 0.4% on a 90 Mhz computer. It is believed that optimized versions of a driver routine may be two to three times faster than these estimates. However, in most circumstances, the greater efficiency advantage in the present invention arises from avoiding monopolization of the CPU for extended periods, such as for periods of about 1.3 milliseconds or longer, so that, during the period the shift register is being clocked out, the CPU can perform other tasks.

Although the driver of FIG. 13 is essentially a time-slice (or time-sharing) polled system, it is possible to configure an interrupt system or a pseudo-interrupt system (e.g., a system which provides a call-out when values are latched). In at least one embodiment, the TSR code occupies a relatively small amount of memory, such as less than one kilobyte.

In addition to the described method of clocking a bit of data from each shift register in response to clock signals which are generated in response to write commands, data can also be sent to the computer through the gameport in a burst mode. In one example, burst mode can be provided selectably, e.g. using a switch on the expansion box, or initiated in response to a signal sent from the computer, e.g. two write commands sent to address 201*h* within a predetermined short time period. One manner of implementing a burst mode is to use one of the button lines 226*c* to provide a clock signal (preferably a periodic clock signal) and placing data on the remaining button lines 226*d, h, i* in a manner synchronized with the clock signal, such as providing a new data bit on each of the other three data lines each time there is a clock signal transition. In one embodiment, after burst mode is initiated, each data burst can be initiated by, e.g. a write to address 201*h* and can extend for a predetermined period of time, sufficient to transfer the desired number of bits over the three button lines used for sending data. At each clock signal transition, the computer will store (e.g. in a buffer) whatever data is on the lines of data bus which correspond to the three button lines being used to output data.

Figure 10:
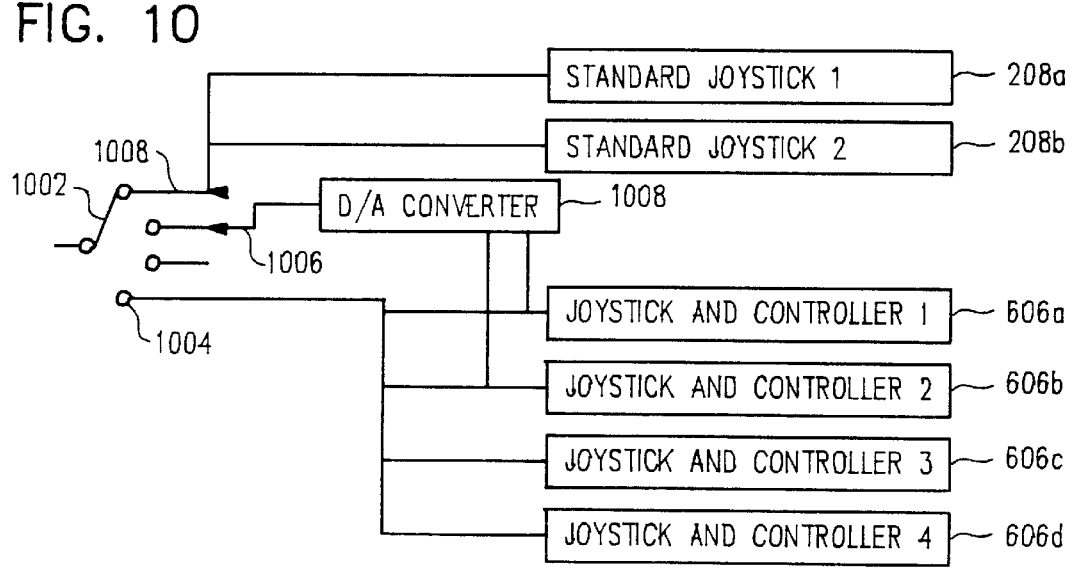
FIG. 10 is a block diagram depicting mode switching for various types of joysticks, according to an embodiment of the present invention.

Although the depicted embodiments are generally backwards compatible with previous hardware, some of the depicted operation modes are configured to use software such as depicted in FIG. 12, which is different from that used in previous systems. According to one embodiment of the invention, the apparatus can be configured to provide software compatibility. i.e.. to provide the same types of analog signals which older types of software are configured to make use of. In the embodiment of FIG. 10, a switch 1002 is provided which can select between various modes of operation. In the first position 1004, the switch connects directly to the four joysticks and controllers, similarly to the fashion depicted in FIG. 6. In the second position 1006, the switch connects to the output of a digital-to-analog converter 1008 which receives output from two joysticks 606*a*, 606*b* and converts the digitized information into analog signals of the type similar to that output by previous devices (as depicted in FIG. 5). In a third position 1008, the switch connects to outputs from two standard joysticks 208*a*, 208*b*, to provide an effective configuration similar to that depicted in FIG. 2. Although the description above describes use of variable resistors 874*a*, 874*b* for converting movement of the stick to an analog signal, other devices for converting movement to an analog signal could be used, such as a strain gauge, a circuit with a variable capacitor, or variable inductor, and the like. Although the description above includes embodiments in which an analog signal is converted to a digital signal by an analog-to-digital converter 872*a*, 872*b*, digital signals 882 can be obtained using a digital encoder such as an optical encoder, e.g., of the type described in U.S. Pat. No. 4,958,071, issued Sep. 18, 1990, commonly assigned herewith and incorporated herein by reference. If desired, analog-to-digital converting circuitry can be coupled between the switch 1002 and the standard joystick so that a standard joystick can communicate through the gameport in a digital fashion, e.g. using the protocol depicted in FIG. 8 to provide for compatibility between new types of software and old types of joysticks. Alternatively, instead of providing a digital to analog converter which converts digital data output by an upstream analog-to-digital converter, the system can be configured such that when the switch is in the second position, connection is made with a separate line (not shown) connecting directly to joystick variable resistors 874*a*, 874*b* to operate in the conventional fashion as depicted in FIG. 4. Although FIG. 10 depicts an embodiment with a 3-way switch, other embodiments can include further choices, such as a burst-mode option, as described above. In one embodiment, the expansion box 624 provides a cable which terminates at a male D15 connector, four new-style joystick connectors on the box face, two standard female D15 connectors on the box face, e.g., for coupling standard joysticks, a 4-way mode switche on the box face, and a housing for the interfacing and control circuitry. In this embodiment, the mode switch allows the user to select among a new-style joystick mode (as depicted in FIG. 6) a split mode supporting a new-style joystick and two "gamepad emulation" button devices, a "pass-through" mode 1008 and a burst-mode.

In light of the above description, a number of advantages of the present invention can be seen. The present invention provides for communication of information through a gameport with a higher bandwidth (i.e. greater amount of information per unit time) than previous devices, preferably while maintaining hardware-compatibility with the existing base of computers having gameports. The present invention permits use of currently existing gameports for providing, to a computer, data from three or more joysticks (five or more axes) and/or a total of five or more buttons. The present invention can be configured to accommodate conventional joysticks and or to work with the existing base of software. The present invention provides for communication through a gameport in a direction from the computer to external or peripheral devices. The present invention provides for communicating proportional movement or position information (as opposed to simple switch information) in a digitized form through a gameport. The present invention provides communicating joystick or other peripheral device information to the computer in a digitized synchronous fashion, preferably in a synchronous serial fashion. The present invention can provide sufficient power to peripheral devices through the gameport. The invention reduces or eliminates the potential for conflict with other devices. The invention can be used without disabling interrupts in order to service the gameport (values are preferably latched). It is believed that, using the present invention, speed can improve by up to a factor of about five (or more) when using a speed-compensating game port. The present invention is relatively easy for the programmer to use, and does not require, for example, counting or polling (i.e., as performed in previous devices in order to determine the length of signals 522, 524, 526, 528). The present invention avoids the need to monopolize the CPU for extended periods. The present invention has an efficiency which depends in part on processor speed, as opposed to previous devices which required a minimum amount of read time for each polling. The present invention provides flexibility for the programmer, allowing the programmer to obtain information in a number of different ways, e.g., by calling from the application program, by using an internal "ticker" and the like. Because the amount of programming needed to implement use of the described device connected to the joystick is smaller than that required by previous devices, the potential for programming errors or software problems is lower, thus reducing the number of technical support calls or inquiries. The present invention provides a device which is relatively low-cost. The present invention provides for relatively small amount of development time and effort, e.g., preferably without the need for providing a special application specific integrated circuit (ASIC). Because interrupts are not disabled for extended periods, the present invention is more easily compatible with user interface software such as anticipated for Microsoft®, Windows '95, or OS/2.

A number of variations and modifications of the present invention can be used. It is possible to use some aspects of the invention without using others. For example, it is possible to use the gameport for transferring information from the computer without providing data to the computer in a digitized synchronous fashion. It is possible to provide digitized synchronous data from joysticks to the computer without providing port and/or hardware compatibility of older analog joysticks. Although the above describes use of the communication bandwidth provided through the, gameport for connecting, e.g., to four joysticks, with four or more buttons each, the additional bandwidth could be used for other purposes such as providing more than 16 total buttons or more than four total joysticks.

Although the embodiments above describe using one of the axis lines to generate a load signal, it is possible to dispense with this signal by providing data clocked out as a continuous stream freeing one of the axis lines (and the write command) for other functions.

Although in the depicted embodiment, each read data cycle 806 transfers 16 bits of data over each line 626c, 626d, 626h, 626i, it is possible to configure a system in which more or fewer bits of data are provided in each cycle, either by making the cycle 806 longer or shorter and/or by providing clock signal 714 more or less frequently (and/or by making shift register 870 larger or smaller). More data could be used to, for example, provide a larger number of bits per axis to provide finer discrimination of joystick position, to provide for a greater number of button bits, and the like. Although the depicted embodiment provides data from a single joystick on each line 626c, 626d, 626h, 626i, it is possible to provide for data from 2 or more joysticks on each line, either by providing for a greater number of data bits per write cycle, as described above, or by using a first 16 bit word for transmitting data from the first joystick, a next 16 bit word for transmitting data from a next joystick, etc. An advantage of the configuration depicted in FIG. 6, however, is that the computer is able to identify the source of data based solely on which data line of the data bus the data resides on. Other configurations would require discrimination among joysticks or other input devices based on, e.g., timing information as well as data bus location.

Figure 9:
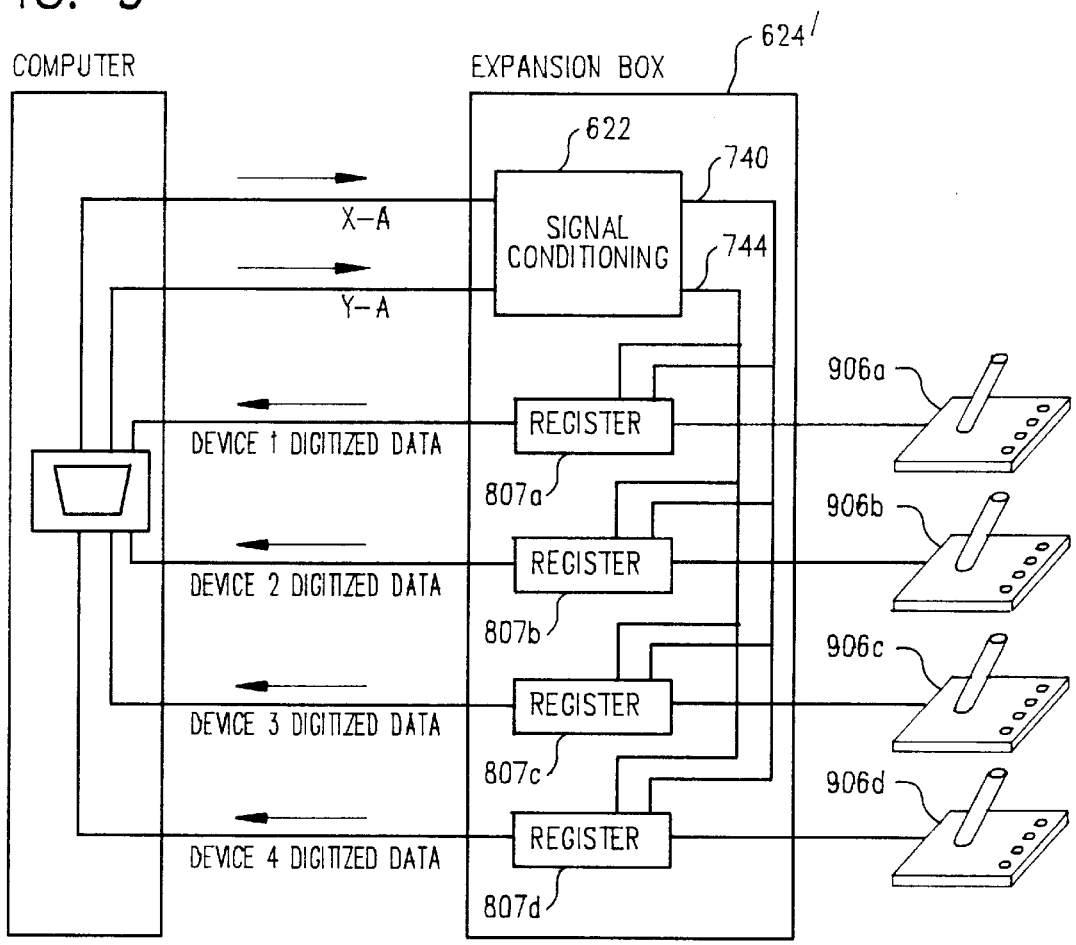
FIG. 9 is a block diagram showing coupling of four joystick devices to a computer via a gameport, using an expansion box, according to an embodiment of the present invention.

Although FIG. 6 depicts the controllers 608a–608d residing on the joystick chassis, it is possible for the registers and/or other controller circuitry to reside in the expansion box, as depicted, e.g., in FIG. 9. The embodiment of FIG. 9 may be used to permit coupling of joysticks 906a–906d which do not have controllers on board as shown in FIG. 9. Since the load and clock signals are used by the controller circuitry, the load and clock signals can be internal to the expansion box, thus eliminating the need to provide the load and clock signals to the joystick devices directly.

The functions described above as being performed by circuitry in the expansion box, such as the discrete components shown in FIG. 8B, may be partially or fully carried out by a microprocessor, e.g., using one or more internal microprocessor registers as the shift registers 870.

Although in the depicted embodiment output from up to four joysticks is provided in the serial fashion over each of the output lines, it would be possible to use the output lines for outputting data in a parallel fashion, e.g., outputting four A-X axis data bits in a first clock cycle, outputting four A-Y axis data bits in the next clock cycle, outputting four button bits in the next clock cycle, outputting four X-B data bits in the next clock cycle, etc.

In one embodiment, circuitry can be provided to detect the type of apparatus connected to various input plugs, i.e., to detect whether a connected device is a standard joystick, a joystick of a type depicted in FIG. 6, or some other type (e.g., by using the identification bits 878), and setting the switch 1002 accordingly.

The gameport can be used with other data acquisition devices than joysticks including, for example, multi-button gamepads, such as the 1 2-button gamepad described above, head tracker devices, remote control (infrared) devices, alarms and doorbells. Positional information can be indicated by means other than a stick 610, such as using a track ball, a stylus or pen, a mouse, and the like. Although some embodiments provide circuitry positioned on an expansion box and/or on joysticks, some or all of the circuitry can be provided in the computer, either on an expansion card or a built-in fashion. Alternatively, the circuitry depicted as residing on an expansion box can be substantially all incorporated in one or more of the joysticks. e.g.. with load and clock information being transmitted from one joystick to another in a daisy-chain fashion. Circuitry can be placed on an expansion board or built-in which uses logic rather than the circuitry of FIG. 7 to output clock and load signals in response to a read and/or write to address 0201h. Thus, a new-type joystick 606a would be compatible with either this new type of gameport interface or, by using an expansion box which could be coupled to an old-style gameport interface. In one embodiment it is possible to use the second axis (Y-A axis) to restrict the number of reads in a particular time period, e.g., to restrict the rate of packet reads to about 20 reads per second. Restricting packet read rates can be useful in avoiding switch bounce problems when, as is common, the bouncing is not provided in the joystick. In one embodiment, the system consumes, on average, less than about 10 microseconds of CPU time per bit of information transferred to the computer (depending on the speed of the computer). Although the embodiment depicted in FIG. 8B depicts a 16-bit shift register for each joystick device, in one embodiment it is possible to accommodate one or more joystick devices having a total of 16 buttons, with two axis (proportional) controls by 32 bits of information per read cycle. In some previous devices, it was typical for a system in which two joysticks were coupled to a single game port (e.g., by a Y connector) to require approximately 1.3 milliseconds per read, or about 1.3% of elapsed time at a read rate of 10 reads per second (since the CPU was effectively monopolized for each 1.3 millisecond period and could not be used to perform other tasks, without risking loss or inaccuracy of data). Although the depicted embodiments generally provide for hardware compatibility with the existing base of computers with gameports, the invention can be implemented in a fashion is which is not hardware-compatible with previous gameports. For example, new types of interface circuitry can be attached to a gameport so that, by using the gameport address, other types of communication can take place. For example, the X-A and Y-A lines can be used to output, from the computer, information other than information relating to the timing of read and write commands to a 0201h. The pattern of reads and/or writes to 0201h can be used to output information and/or commands from the computer (such as using two closely spaced write to initiate a data burst. The Y-A and Y-B lines can be used to output and/or input information. The interface can be configured to use one or more of the button lines for outputting data rather than for (or in addition to) inputting data. By providing for additional types of data output through the gameport, other types of devices can be connected to the gameport. For example, information about the status of registers or other items in the computer can be output to peripheral devices. In this way, it may be possible for the software, e.g., to control the amount of resistance which a user perceives in the joystick, such as for simulating increasing resistance to a steering wheel when simulated driving occurs at high speeds. The device may output data to the expansion box, joystick or other peripheral device for configuring or reprogramming the expansion box or peripheral device, e.g., for associating a physical button on the joystick device with a logical button location (dataline and/or timeslice) or changing the value of resistances 704a, 704b or otherwise changing or selecting the communications timing or protocol. The ability to output communication from the computer through a gameport to peripheral devices makes it possible for the computer to query a peripheral device or otherwise obtain information about peripheral devices, e.g., to configure the computer and peripheral device hardware and/or software to operate in a desired way (so-called "plug and play").

Although the application has been described by way of preferred embodiments and certain variations and modifications, other variations and modifications can also be used, the invention being defined by the following claims:

What is claimed is:

1. In a computer coupled to an external device using a gameport, said gameport having a gameport address and at least first, second and third lines, said external device having at least a memory device, a method for communicating between said computer and said external device, comprising the steps of:

receiving positional data from said external device;

converting said positional data into a plurality of data bits;

storing said plurality of data bits in said memory device;

transmitting said plurality of data bits from said memory device to said computer using said gameport;

placing a clock signal on said first of said gameport lines by said external device; and placing at least some of said plurality of data bits on at least said second of said gameport lines synchronized with said clock signal.

2. The method, as claimed in claim 1, further comprising the step of:

configuring said gameport to receive said positional data from said external device.

3. The method, as claimed in claim 1, further comprising the step of:

configuring said gameport to permit coupling to variable resistors in said external device.

4. The method, as claimed in claim 1, wherein said external device is a user-positionable control device.

5. The method, as claimed in claim 1, wherein said external device is a joystick.

6. The method, as claimed in claim 1, wherein said external device comprises a joystick and wherein said plurality of data bits are representative of at least an axis position of said joystick.

7. The method, as claimed in claim 1, wherein said external device comprises a joystick and wherein said plurality of data bits are representative of at least a button position of said joystick.

8. The method, as claimed in claim 1, wherein said plurality of data bits are transmitted in a synchronous serial fashion.

9. The method, as claimed in claim 1, further comprising the step of outputting from said external device to said computer information identifying the type of external device.

10. In a computer coupled to an external device using a gameport, said gameport having a gameport address, said external device having at least a memory device, a method for communicating between said computer and said external device, comprising the steps of:

receiving positional data from said external device;

converting said positional data into a plurality of data bits;

storing said plurality of data bits in said memory device; and transmitting said plurality of data bits from said memory device to said computer using said gameport;

wherein said memory device comprises a shift register.

* * * * *